US008138771B2

(12) United States Patent
Nurmi

(10) Patent No.: US 8,138,771 B2
(45) Date of Patent: Mar. 20, 2012

(54) TOUCH CONTROLLER WITH READ-OUT LINE

(75) Inventor: Juha H-P Nurmi, Salo (FI)

(73) Assignee: Nokia Corporation, Espoo (FI)

( * ) Notice: Subject to any disclaimer, the term of this patent is extended or adjusted under 35 U.S.C. 154(b) by 376 days.

(21) Appl. No.: 12/315,856

(22) Filed: Dec. 5, 2008

(65) Prior Publication Data

US 2010/0141272 A1 Jun. 10, 2010

(51) Int. Cl.
*G01R 27/28* (2006.01)
*G01R 31/08* (2006.01)
*G01R 31/00* (2006.01)
*G01P 3/42* (2006.01)

(52) U.S. Cl. .... 324/654; 324/176; 324/525; 324/756.06
(58) Field of Classification Search .................. 324/519, 324/525, 537, 654–696, 176, 756.06
See application file for complete search history.

(56) References Cited

U.S. PATENT DOCUMENTS

| | | | | |
|---|---|---|---|---|
| 4,258,315 A * | 3/1981 | Westra | | 324/654 |
| 4,822,957 A | 4/1989 | Talmage, Jr. et al. | | 178/18 |
| 4,929,934 A | 5/1990 | Ueda et al. | | |
| 5,279,148 A * | 1/1994 | Brandes | | 73/40.5 R |
| 5,283,558 A | 2/1994 | Chan | | |
| 5,973,417 A * | 10/1999 | Goetz et al. | | 307/129 |
| 6,593,757 B2 * | 7/2003 | Nakayama et al. | | 324/686 |
| 6,960,790 B2 * | 11/2005 | Miyai et al. | | 257/77 |
| 7,015,705 B2 * | 3/2006 | Inaba et al. | | 324/678 |
| 7,262,658 B2 * | 8/2007 | Ramaswamy et al. | | 330/251 |
| 7,285,964 B1 * | 10/2007 | Hsu et al. | | 324/707 |
| 7,456,637 B2 * | 11/2008 | Canegallo et al. | | 324/662 |
| 7,560,938 B2 * | 7/2009 | Van Berkel et al. | | 324/662 |
| 7,782,062 B2 * | 8/2010 | Bier | | 324/525 |
| 2004/0201370 A1 * | 10/2004 | Clauss et al. | | 324/67 |
| 2004/0207606 A1 | 10/2004 | Atwood et al. | | |
| 2007/0176609 A1 * | 8/2007 | Ely et al. | | 324/678 |
| 2007/0296709 A1 | 12/2007 | GuangHai | | |
| 2008/0018608 A1 | 1/2008 | Serban et al. | | |
| 2008/0018611 A1 | 1/2008 | Serban et al. | | |
| 2008/0116904 A1 * | 5/2008 | Reynolds et al. | | 324/678 |
| 2008/0296073 A1 | 12/2008 | McDermid | | |
| 2008/0297487 A1 * | 12/2008 | Hotelling et al. | | 345/173 |

FOREIGN PATENT DOCUMENTS

| | | |
|---|---|---|
| EP | 0309946 | 4/1989 |
| JP | 08110828 A | 4/1996 |
| WO | 2008009687 | 1/2008 |

OTHER PUBLICATIONS

Patent Abstracts of Japan, Publication No. 08-110828 A, "Depression Position Detecting Device for Touch Panel", Published Apr. 30, 1996, (1 page).
International Search Report and Written Opinion of the ISA, mailed Mar. 23, 2010 in corresponding International Application No. PCT/FI2009/050960 (11 pages total).

* cited by examiner

*Primary Examiner* — Huy Q Phan
*Assistant Examiner* — Joshua Benitez

(57) ABSTRACT

It is disclosed to measure the impedance of a read-out line. The read-out line includes at least two cascaded electrical circuit segments, each electrical circuit segment including two longitudinal arms, wherein one of the longitudinal arms includes an electrical component, and a lateral arm including a switch configured to close in the presence of an object in the vicinity of the switch. The measured impedance of the read-out line can be compared to a preset value corresponding to an allowable value of the impedance of the read-out line.

19 Claims, 6 Drawing Sheets

TOUCH CONTROLLER WITH READ-OUT LINE

FIELD

This invention relates to read-out lines comprising switches and electrical components.

BACKGROUND

Read-out lines can serve for reading-out signals. They can be employed in a variety of applications. An exemplary application is the use of read-out lines in the field of user interfaces, for example touch pads or touch screens. To achieve a good market acceptance, quick read-out is a key issue. Moreover, user interfaces often contain a plurality of read-out lines. Hence, it has been the industry's constant aim to develop read-out lines that can be manufactured at low cost while still providing high performance. In particular in the field of mobile devices, signal read-out is often required to consume only minimum power, which is another issue developers try to take care of.

SUMMARY OF SOME EXEMPLARY EMBODIMENTS OF THE INVENTION

According to a first aspect of the present invention, a first apparatus comprising a read-out line is disclosed. The read-out line comprises at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch. The apparatus also comprises an analyzer configured to measure the impedance of the read-out line and a comparator configured to compare the measured impedance of the read-out line to a preset value corresponding to an allowable value of the impedance of the read-out line.

According to the first aspect of the present invention, further a second apparatus comprising a read-out line is disclosed. The read-out line comprises at least two cascaded electrical circuit segments, each electrical circuit segment comprising two longitudinal arms, wherein one of the longitudinal arms comprises an electrical component, and a lateral arm comprising means for closing in the presence of means for inputting in their vicinity. The apparatus also comprises means for measuring the impedance of the read-out line and means for comparing the measured impedance of the read-out line to a preset value corresponding to an allowable value of the impedance of the read-out line.

The means for closing in the presence of means for inputting in their vicinity may for instance comprise a switch, the means for inputting present in the vicinity of the means for closing may for instance be any tangible object present in said vicinity, the means for measuring the impedance of the read-out line may for instance comprise an analyzer configured to measure the impedance of the read-out line and the means for comparing the measured impedance of the read-out line to a preset value may for instance comprise a comparator configured to compare the measured impedance of the read-out line to a preset value.

It is noted that, in the following, whenever it is referred to a switch, an object present in the vicinity of such a switch, an analyzer configured to measure the impedance of a read-out line and a comparator configured to compare the measured impedance of a read-out line to a preset value, it is, unless otherwise stated, also referred to the corresponding means as defined by the above enumeration. Thereby, clarity and conciseness of the present application is enhanced. However, it is to be understood that the respective terms are not identical, but that their meanings may overlap with regard to certain aspects.

According to a second aspect of the present invention, a method is disclosed. It comprises measuring the impedance of a read-out line, the read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch. The method further comprises comparing the measured impedance of the read-out line to a preset value corresponding to an allowable value of the impedance of the read-out line.

According to a third aspect of the present invention, further a computer-readable medium having a computer program stored thereon is disclosed, the computer program comprising instructions operable to cause a processor to control an analyzer to measure the impedance of a read-out line, the read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch. The computer program further comprises instructions operable to cause a processor to compare the measured impedance of the read-out line to a preset value corresponding to an allowable value of the impedance of the read-out line.

The computer-readable medium may for instance be embodied as an electric, magnetic, electro-magnetic, optic or other storage medium, and may either be a removable storage medium or a storage medium that is fixedly installed in an apparatus or device.

According to a fourth aspect of the present invention, further a program is disclosed, comprising program code for performing the method according to the second aspect of the present invention, when the program is executed on a processor. The program may for instance be a computer program that is readable by a computer or processor. The program code may then for instance be computer program code. The program may for instance be distributed via a network, such as for instance the Internet. The program may for instance be stored on a tangible readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to a fifth aspect of the present invention, further a program is disclosed which causes a processor to control an analyzer to measure the impedance of a read-out line, the read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch. The program further causes a processor to compare the measured impedance of the read-out line to a preset value corresponding to an allowable value of the impedance of the read-out line.

The program may for instance be a computer program that is readable and/or executable by a computer or processor. The program may for instance be a computer program with computer program code. The program may be stored on a tangible readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

These and other aspects of the invention will be apparent from and elucidated with reference to the detailed description presented hereinafter. The features of the present invention and of its exemplary embodiments as presented above are understood to be disclosed also in all possible combinations with each other.

In the following, whenever it is referred to the first aspect of the present invention, both the first and the second apparatus according to the first aspect of the present invention are addressed.

In an exemplary embodiment according to all aspects of the present invention, cascading the electrical circuit segments corresponds to electrically coupling a first longitudinal arm of a first electrical circuit segment to a first longitudinal arm of a second electrical circuit segment and electrically coupling a second longitudinal arm of the first electrical circuit segment to a second longitudinal arm of the second electrical circuit segment.

No limitation pertains to the employed technology of the switch forming part of a lateral arm of an electrical circuit segment. A suitable switch merely has to be configured to close in the presence of an object present in its vicinity. An object contacting a switch either directly or indirectly, i.e. via an intervening object, is of course also present in the vicinity of the switch.

According to exemplary embodiments of the present invention, a switch can assume two states. A first state can be referred to as an open state. Alternatively, it can simply be said that the switch is open. An open switch does either not allow electrical current to pass through it or it constitutes at least a significantly increased resistance compared to a scenario in which the switch is closed.

An electrically conductive element that is configured to close a gap in another electrical conductor if a force is exerted on the electrically conductive element is a switch configured to close in the presence of an object in its vicinity or, more precisely, a switch configured to close if contacted by an object. Other switches are based on an optical mode of operation. Among these optical switches are for example switches that emit light. In the presence of a suitable object in the vicinity of the optical switch, the light emitted by the switch can be reflected back to switch. There, it can be detected by a photosensitive element, a photodiode for instance. The current generated by the photodiode may then be used to control an electrical circuit, comprising for instance transistors, to perform the actual switching operation. Switches having a mode of operation that is based on the detection of a change of capacitance caused by the presence of an object in their vicinity may also be employed. An advantage of optical switches can be that they may not require direct mechanical contact in order to switch from an open to a closed state. If used in a touch screen display, this can be beneficial due to the avoidance of scratches on the display surface.

In exemplary embodiments according to all aspects of the present invention, a closed switch can automatically reassume an open state if there is no object present in its vicinity. This may be done either directly after the object has left the vicinity of the switch or it may be done with a temporal offset. It is not a precondition for the present invention that the switches being used for a certain read-out line have identical modes of operation or identical properties. This also applies to a set of read-out lines. While a first read-out line may employ pressure sensitive switches, a second read-out line may employ optical switches.

To name but two examples of an object that can cause an adequately configured switch to close if it is present in the vicinity of the switch, such an object can for instance be a user's body part such as a user's finger or it can be a stylus.

No restrictions apply to the electrical component forming part of a longitudinal arm of an electrical circuit segment. The electrical component may have electrical parameters such as an inductance, a capacitance and an ohmic resistance. It is not a precondition for the present invention that the electrical component is a distinct element such as, for example, a surface-mount device. However, if distinct elements are employed as electrical components, it is not required by the present invention that a first longitudinal arm of a first electrical circuit segment comprising an electrical component is electrically coupled to a longitudinal arm of a seconded electrical circuit segment also comprising an electrical component in the form of a distinct element. For instance, a distinct electrical component may be provided in the longitudinal arm of the second electrical circuit segment which is electrically coupled to the second longitudinal arm of the first electrical circuit segment, but not in the longitudinal arm of the second electrical circuit segment that is electrically coupled to the first longitudinal arm of the first electrical circuit segment.

In an exemplary embodiment according to all aspects of the present invention, the electrical component comprises an electrical conductor spanning longitudinal arms of a plurality of electrical circuit segments. For instance, instead of employing distinct electrical components, an electrical conductor having, for example, a certain resistance per unit length, capacitance per unit length and inductance per unit length can be employed. In such a case, the electrical component forming part of a longitudinal arm of an electrical circuit segment can correspond to the section of the electrical conductor forming part of the longitudinal arm of the respective electrical circuit segment. The electrical conductor may be manufactured as a continuous conductor spanning several or even all cascaded electrical circuit segments of a read-out line. An advantage of this exemplary embodiment can be that manufacturing costs are lowered compared to, for example, employing surface-mount devices as electrical components. Furthermore, the manufacturing process can be sped up because only a single conductor has to be provided instead of a distinct electrical component for each electrical circuit segment. Thus, the process step of providing an electrical conductor can substitute a plurality of steps comprising provision of several distinct electrical components.

Closing a switch of an electrical circuit segment of the read-out line can affect the impedance of the read-out line. As elucidated above, an open switch may in exemplary embodiments not allow electrical current to pass through it. In consequence, if the switch forming part of the lateral arm of an electrical circuit segment is open, it is possible that there is no closed electrical path incorporating the electrical component of a longitudinal arm of said electrical circuit segment provided. The impedance of the read-out line may thus not be affected by the electrical parameters of the electrical component provided in a longitudinal arm of said electrical circuit segment. Closing the switch may on the other hand cause formation of a closed electrical path of the read-out line incorporating the electrical component provided in a longitudinal arm of said electrical circuit segment. Due to the incorporation of the electrical component of said electrical circuit segment into the current path of the read-out line, the impedance of the read-out line assumes another value compared to the case in which the switch of the lateral arm of said electrical circuit segment is open.

The impedance of the read-line can be measured, for example by using any suitable analyzer. It is readily clear that measuring the impedance of an electrical circuit is likely to require supplying electrical power to the electrical circuit. An analyzer used for measuring the impedance of a read-out line according to the present invention may therefore comprise a power supply. Alternatively, electrical power can also be provided by a separate power supply. It is of course possible to use any pertinent method for performing impedance measurement.

In exemplary embodiments of all aspects of the present invention, measuring the impedance of a read-out line comprises measuring only one of the inductance, the capacitance and the ohmic resistance of the read-out line. Thus, only one of these three electrical parameters is chosen to be measured, while the others are not considered. For example, given that in each electrical circuit segment the electrical component has a certain ohmic resistance but the inductance and the capacitance are negligible, it may suffice to measure the ohmic resistance of the read-out line. Accordingly, with the electrical components of the electrical circuit segments of the read-out line being purely capacitive, i.e. the ohmic resistance and the inductance being either zero or negligible, measuring the impedance of the read-out line can be limited to measuring the capacitance. Impedance measurement may accordingly be limited to inductance measurement if the electrical components of the electrical circuit segments of the read-out line are purely inductive. Compared to impedance measurement, measuring solely the ohmic resistance, the capacitance or the inductance of the read-out line can have the advantage of reduced complexity and may yield the possibility of employing a simpler analyzer that can be manufactured at low costs.

It is to be understood that measuring the impedance of a read-out line may in some exemplary embodiments according to all aspects of the present invention correspond to an indirect impedance measurement. For instance, a complex impedance of a the read-out line can affect the phase of a current or a voltage applied to it. In other words, the applied current or voltage can be subject to a phase shift, wherein the phase shift depends on the impedance of the read-out line. Measuring the phase shift may then be thought of as a form of measuring the impedance of the read-out line. The impedance of the read-out line can be frequency dependent. Hence, impedance measurement may involve frequency measurement. If measuring the impedance of the read-out line comprises measuring only the ohmic resistance of the read-out line as in some exemplary embodiments of all aspects of the present invention, measuring may be carried out in a straightforward manner. For instance, one of a constant voltage and a constant electrical current can be applied to the read-out line and the other parameter can be measured. In order to obtain the ohmic resistance, a simple division may then suffice according to Ohm's law.

According to exemplary embodiments of all aspects of the present invention, the measured impedance of the read-out line may be compared to a preset value, for instance by means of a comparator. The preset value corresponds to an allowable value of the impedance of the read-out line. With the read-out line comprising the minimum number of two switches, there are four different combinations of states of the switches possible. Hence, there a maximum number of four different values the impedance can assume. Put differently, there are four allowable values of the impedance of the read-out line the measured impedance can be compared to. An advantage of an exemplary embodiment of all aspects of the present invention can be that comparison of the measured impedance of the read-out line to a preset value corresponding to an allowable value of the impedance of the read-out line can allow at least partially determining which of the switches of the read-out line is closed.

To further facilitate understanding the present invention, possible effects of open and closed switches are now explained with regard to an exemplary scenario. In the exemplary scenario, the read-out line comprises exactly two electrical circuit segments. A power supply can be incorporated into one of the longitudinal arms of a first electrical circuit segment of the read-out line. If the switch of the lateral arm of said first segment is closed and the switch of the lateral arm of the second electrical circuit segment of the read-out line is open, a current path is formed comprising the longitudinal arms and the electrical component as well as the lateral arm and the switch of the first segment. With the switch of the lateral arm of the second circuit segment being open, an electrical current may be prevented from passing the second electrical circuit segment because it is not incorporated in a closed electrical path. Thus, the electrical parameters of the electrical component of the second circuit segment cannot affect the value of the overall impedance of the read-out line. The impedance can then be determined by the electrical parameters of the electrical component of the first electrical circuit segment. Inverting the states of the switches, i.e. opening the switch of the first electrical circuit segment and closing the switch of the second electrical circuit segment alters the impedance of the read-out line. For example, an electrical current may pass from the power supply via the electrical component of the first electrical circuit segment to the electrical component of the second electrical circuit segment. From thereon, it may flow through the closed switch of the second electrical circuit and back to the power supply. If, for instance, both the electrical component of the first electrical circuit segment and the electrical component of the second electrical circuit segment are ohmic resistors having the values $R_1$ and $R_2$, respectively, in the first case, i.e. with the switch of the first electrical circuit segment being closed and the switch of the second electrical circuit segment being open, the electrical impedance of the read-out line can be purely ohmic and have the value $R_1$. In the second case, i.e. with the switch of the first electrical circuit segment being open and the switch of the second electrical circuit segment being closed, the electrical impedance of the read-out line can also be purely ohmic but have the value $R_1+R_2$.

Measuring the impedance of the read-out line and comparing the measured impedance to the value $R_1$, i.e. a preset value corresponding to an allowable value of the impedance of the read-out line, will in the first case show that they are identical. On the contrary, in the second case, the comparison will indicate that they are different, but in this case comparing the measured impedance of the read-out line to the value $R_1+R_2$ will show that they are identical. Thus, it may be inferred from a comparison result which of the switches of the read-out line is closed.

A difference between the measured impedance of a read-out line and a preset value to which it is compared may still yield a positive comparison result confirming the identity of the values if the difference does not exceed a certain acceptable tolerance.

According to an exemplary embodiment of all aspects of the present invention, a read-out line forms part of a user interface. It is of course possible that an analyzer configured to measure the impedance of the read-out line and a comparator configured to compare the measured impedance of the read-out line to a preset value corresponding to an allowable value of the impedance of the read-out line also form part of the user interface. On the other hand, and although they may contribute to the technical functionality of the user interface, the analyzer and the comparator can alternatively be provided in a housing separate from that of the user interface.

User interfaces are used in a variety of applications. They serve for providing user instructions to, among many others, computers, mobile phones, television set-top boxes or personal digital assistants. In industrial applications, for instance, user interfaces are used for controlling manufacturing processes. User interface design is an important factor to account for when aiming at enhanced user experience.

An exemplary user interface is a touch pad. A touch pad has specific areas that trigger execution of a certain action associated with the respective area if a user places an object, for example a finger or a stylus, in the vicinity of the area. As an example, in a drag-and-drop software environment, icons shown on a display can be moved by moving a finger on the surface of a touch pad accordingly. Touch pads can be operated intuitively by most users with out requiring any training or experience. Therefore, they are widely used.

According to an exemplary embodiment of all aspects of the present invention, the user interface the read-out line forms part of is a touch screen. An advantage of a touch screen is that the user can be enabled to receive direct visual feedback on the operations he performs. Again considering a drag-and-drop software environment, objects can be displayed on the touch screen and a user can be enabled to move these objects along the screen by moving his finger on the display surface accordingly, while observing how the icon moves across the screen.

Another advantage of touch screens is that in some cases no additional user interface has to be provided. Hence, a device comprising a touch screen can have compact proportions compared to a similar device equipped with a display and an additional user interface such as a keypad. This is especially beneficial for mobile devices. Building compact mobile devices is a key issue with respect to market acceptance of mobile devices.

How a read-out line according to the present invention can be employed in a user interface is exemplarily described in the following.

Each of the two switches of an exemplary read-out line is configured to close in the presence of an object in its vicinity. Thus, in some exemplary embodiments of all aspects of the present invention, it can be derived from the comparison result whether one of the switches is closed, and if so, which of the switches is closed. Therefrom it can be in turn inferred whether there is an object present in the vicinity of the switch. In an exemplary scenario, a user can exert pressure on one of the switches with his finger. Taking advantage of the embodiment currently described, it can be determined on which of the switches the user exerts pressure. In other words, localization of the position of the user's finger along the read-out line is rendered possible.

According to an exemplary embodiment of all aspects of the present invention, a plurality of read-out lines, i.e. at least two read-out lines, can be provided. There are no limitations pertaining to the mutual arrangement of the read-out lines. They may for instance have different orientations, mutual distances or curvatures. Their lengths may differ as well as the distance of the switches along the read-out lines. Even the technologies underlying the switches may not be the same for all switches.

Provision of a plurality of read-out lines can have several advantages. First, in the context of a user interface, the overall number of provided switches can thereby be increased, thus also increasing the number of possible combinations of states of the switches. In some cases the execution of a certain action, for example a processing step of a software program running on a central processing unit (CPU) electrically coupled to the comparator, may depend on the combination of the states of the switches at a certain point of time. Increasing the number of switches makes available a larger set of user input commands.

Second, a larger area can be covered with switches by providing a plurality of read-out lines.

Third, localization of an object present in the vicinity of a switch can then not only be performed along a single read-out line. Instead, additional information may be gained by determining which of the read-out lines of the plurality of read-out lines has a closed switch at a certain point of time. For instance, two read-out lines that are not arranged on the same imaginary line but have a certain offset to one another can add another dimension to the localization of an object present in the vicinity of a switch of one of the read-out lines. In particular, it may be possible to determine which of the read-out lines has a closed switch and it may further be possible to determine the position of said switch along the read-out line. In other words, a closed switch can provide information on two independent parameters, with the information which of the read-out lines comprises the closed switch being the first parameter and the information which of the switches of said read-out line is closed being the second parameter.

With respect to employing embodiments of all aspects of the present invention in the field of user interfaces, additional advantages may arise. For example, some current integrated touch screens, i.e. touch screens that do not need to be equipped with an additional touch detection add-on unit but have the touch detection components integrated into display from the outset, employ a matrix structure of sensor elements for touch detection. The matrix structure can comprise a first plurality of parallel electrically conductive lines in a first layer and a second plurality of parallel electrically conductive lines in a second layer, wherein the first and the second plurality of electrically conductive lines are arranged perpendicularly to one another. Thus, the electrically conductive lines form a grid. Pressure exerted on at least one of the layers can cause an electrically conductive line of the first layer to contact an electrically conductive line of the second layer at a certain point. One may thus also say that the intersection of an electrically conductive line of the first layer and an electrically conductive line of the second layer forms a switch that can be closed by exerting pressure on one of the lines. Such a switch can be seen as an element of the matrix structure. As an electrically conductive line of the first layer and an electrically conductive line of the second layer are electrically coupled if the switch is closed, applying a voltage between the electrically conductive lines of the first layer and the electrically conductive lines of the second layer can be used to detect the point of contact of the electrically conductive line of the first layer and the electrically conductive line of the second layer among a plurality of possible contact points. Due to the electrical coupling of the lines, a voltage drop occurs at said point or matrix element. It can be detected by performing a voltage measurement. According to all aspects of the present invention, the touch screen can be an integrated touch screen.

However, to obtain a touch detection resolution that is sufficiently high, the grid of electrically conductive lines has to be dense. Many possible contact points of the electrically conductive lines of the first layer and the electrically conductive lines of the second layer then have to be polled in order to find out if pressure is exerted on the respective surface position of the touch screen.

A common approach to polling each of the matrix elements is to use either the first plurality of electrically conductive lines or the second plurality of electrically conductive lines as read-out lines, while each of the electrically conductive lines of the other plurality of electrically conductive lines is provided with a switch, for example a metal-oxide-semiconductor field-effect transistor (MOSFET). By controlling a voltage applied to the gate of a MOSFET, an electrical current can be allowed to pass through it or it can block electrical current. Hence, it serves as a voltage controlled switch with an open and a closed state. Due to the voltage applied to the MOSFET gate, the plurality of electrically conductive lines provided with MOSFETs may be referred to as gate lines.

Opening the switch of only one gate line at a time, allows polling the potential contact points of the activated gate line and the read-out lines, for instance by measuring if a current flows via the relevant matrix elements. Each measurement requires a certain period of time. Even if the contact points of the activated gate line with each of the read-out lines are checked in parallel, the necessity of activating one gate line after another can be a limiting factor when it comes to reducing the time needed for polling all matrix elements. Simply increasing the polling frequency may not be an option because it can adversely affect power consumption or even cause blocking of radio frequencies that are otherwise occupied. However, users may consider high polling latency unpleasant.

Exemplary embodiments of all aspects of the present invention can overcome this issue. Measuring the impedance of a read-out line according to the present invention and comparing the measured impedance to a preset value can enable detection of a closed switch anywhere along the read-out line with only one impedance measurement. Additionally, the impedance of each read-out line of a plurality of read-out lines can be measured and compared in parallel. In consequence, the latency can be reduced significantly in some exemplary embodiments according to all aspects of the present invention. Moreover, not having to provide electrical components having the functionality of the MOSFETs of the above example, manufacturing costs can be reduced as well as the required space for the touch detection components. Since a power supply for MOSFETs is also not needed, energy consumption may be reduced, too.

According to exemplary embodiments of all aspects of the present invention, the read-out lines of a plurality of read-out lines have a similar configuration. Similar design of the read-out lines regarding the electrical components of the longitudinal arms of the electrical circuit segments may for example yield a corresponding set of allowable values of impedances for each of the plurality of read-out lines. Benefits may arise from having the same sets of allowable values of the impedances of the read-out lines in form of reduced memory storage capacities needed to accommodate the preset values for the comparison. A similar read-out line configuration may also involve that the read-out lines have the same length.

A read-out line comprising a closed switch may also be referred to as an activated read-out line.

According to an exemplary embodiment of the first apparatus according to the first aspect of the present invention, the analyzer is configured to measure the impedances of a plurality of read-out lines sequentially. According to an exemplary embodiment of the second apparatus according to the first aspect of the present invention, the second apparatus can comprise means for measuring the impedances of a plurality of read-out lines sequentially. The means for measuring the impedances of the plurality of read-out lines sequentially can for example comprise an analyzer configured to measure the impedances of the plurality of read-out lines sequentially. It is noted that, in the following, whenever it is referred to an analyzer configured to measure the impedances of a plurality of read-out lines sequentially, it is, unless otherwise stated, also referred to the means for measuring the impedances of a plurality of read-out lines sequentially. However, it is to be understood that the respective terms are not identical, but that their meanings may overlap with regard to certain aspects. According to an exemplary embodiment of the method according to the second aspect of the present invention, the method comprises measuring the impedances of a plurality of read-out lines sequentially. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium further comprises instructions operable to cause a processor to control an analyzer to measure the impedances of a plurality of read-out lines sequentially. Likewise, an exemplary embodiment of the program according to the fifth aspect of the present invention can comprise causing a processor to control an analyzer to measure the impedances of a plurality of read-out lines sequentially.

An advantage of these embodiments can be that a single analyzer may suffice for all read-out lines of the plurality of read-out lines. In consequence, manufacturing cost and required space can be reduced.

According to an exemplary embodiment of the first apparatus according to the first aspect of the present invention, the comparator is configured to compare the measured impedances of a plurality of read-out lines to preset values, each preset value corresponding to an allowable value of the impedance of the respective read-out line, sequentially. According to an exemplary embodiment of the second apparatus according to the-first aspect of the present invention, the second apparatus comprises means for comparing the measured impedances of a plurality read-out lines to preset values, each preset value corresponding to an allowable value of the impedance of the respective read-out line, sequentially. The means for comparing the measured impedances of a plurality read-out lines to preset values, each preset value corresponding to an allowable value of the impedance of the respective read-out line, sequentially can for example comprise a comparator configured to compare the measured impedances of a plurality of read-out lines to preset values, each preset value corresponding to an allowable value of the impedance of the respective read-out line, sequentially. It is noted that, in the following, whenever it is referred to a comparator configured to compare the measured impedances of a plurality of read-out lines to preset values, each preset value corresponding to an allowable value of the impedance of the respective read-out line, sequentially it is, unless otherwise stated, also referred to the means for comparing the measured impedances of a plurality read-out lines to preset values, each preset value corresponding to an allowable value of the impedance of the respective read-out line, sequentially. However, it is to be understood that the respective terms are not identical, but that their meanings may overlap with regard to certain aspects. According to an exemplary embodiment of the method according to the second aspect of the present invention, the method comprises comparing the measured impedances of a plurality read-out lines to preset values, each preset value corresponding to an allowable value of the impedance of the respective read-out line, sequentially. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium comprises instructions operable to cause a processor to compare the measured impedances of a plurality of read-out lines to preset values, each preset value corresponding to an allowable value of the impedance of the respective read-out line, sequentially. Likewise, an exemplary embodiment of the program according to the fifth aspect of the present invention can comprise causing a processor to compare the measured impedances of a plurality of read-out lines to preset values, each preset value corresponding to an allowable value of the impedance of the respective read-out line, sequentially.

Again, an advantage of this embodiment can be that a single comparator may suffice for all read-out lines of the plurality of read-out lines. Sequential impedance measurement can be combined with sequential comparison to preset values.

According to an exemplary embodiment of the first apparatus according to the first aspect of the present invention, the analyzer is configured to measure the impedances of a plurality of read-out lines parallelly, i.e., in a parallel manner. According to an exemplary embodiment of the second apparatus according to the first aspect of the present invention, the second apparatus can comprise means for measuring the impedances of a plurality of read-out lines parallelly. The means for measuring the impedances of the plurality of read-out lines parallelly can for example comprise an analyzer configured to measure the impedances of the plurality of read-out lines parallelly. It is noted that, in the following, whenever it is referred to an analyzer configured to measure the impedances of a plurality of read-out lines parallelly, it is, unless otherwise stated, also referred to the means for measuring the impedances of a plurality of read-out lines parallelly. However, it is to be understood that the respective terms are not identical, but that their meanings may overlap with regard to certain aspects. According to an exemplary embodiment of the method according to the second aspect of the present invention, the method comprises measuring the impedances of a plurality of read-out lines parallelly. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium further comprises instructions operable to cause a processor to control an analyzer to measure the impedances of a plurality of read-out lines parallelly. Likewise, an exemplary embodiment of the program according to the fifth aspect of the present invention can comprise causing a processor to control an analyzer to measure the impedances of a plurality of read-out lines parallelly.

To measure the impedances of the plurality of read-out lines parallelly, the analyzer can comprise several analyzers, namely one analyzer for each read-out line of the plurality of read-out lines.

According to an exemplary embodiment of the first apparatus according to the first aspect of the present invention, the comparator is configured to compare the measured impedances of a plurality of read-out lines to preset values, each preset value corresponding to an allowable value of the impedance of the respective read-out line, parallelly. According to an exemplary embodiment of the second apparatus according to the first aspect of the present invention, the second apparatus comprises means for comparing the measured impedances of a plurality read-out lines to preset values, each preset value corresponding to an allowable value of the impedance of the respective read-out line, parallelly. The means for comparing the measured impedances of a plurality read-out lines to preset values, each preset value corresponding to an allowable value of the impedance of the respective read-out line, parallelly can for example comprise a comparator configured to compare the measured impedances of a plurality of read-out lines to preset values, each preset value corresponding to an allowable value of the impedance of the respective read-out line, parallelly. It is noted that, in the following, whenever it is referred to a comparator configured to compare the measured impedances of a plurality of read-out lines to preset values, each preset value corresponding to an allowable value of the impedance of the respective read-out line, parallelly it is, unless otherwise stated, also referred to the means for comparing the measured impedances of a plurality read-out lines to preset values, each preset value corresponding to an allowable value of the impedance of the respective read-out line, parallelly. However, it is to be understood that the respective terms are not identical, but that their meanings may overlap with regard to certain aspects. According to an exemplary embodiment of the method according to the second aspect of the present invention, the method comprises comparing the measured impedances of a plurality read-out lines to preset values, each preset value corresponding to an allowable value of the impedance of the respective read-out line, parallelly. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium comprises instructions operable to cause a processor to compare the measured impedances of a plurality of read-out lines to preset values, each preset value corresponding to an allowable value of the impedance of the respective read-out line, parallelly. Likewise, an exemplary embodiment of the program according to the fifth aspect of the present invention can comprise causing a processor to compare the measured impedances of a plurality of read-out lines to preset values, each preset value corresponding to an allowable value of the impedance of the respective read-out line, parallelly.

To compare the measured impedances of a plurality of read-out lines to preset values, each preset value corresponding to an allowable value of the impedance of the respective read-out line, parallelly, the comparator can comprise several comparators, namely one comparator for each read-out line of the plurality of read-out lines.

Parallel impedance measurement and parallel comparison of measured impedances to preset values can help reduce the latency of determining which of the switches of the plurality of read-out lines is closed. In other words, faster polling of the read-out lines is enabled. Users may notably benefit from fast read-out line polling in user interfaces. Namely, annoying delays in inputting user commands can be significantly reduced, thus enhancing user experience. Combined parallel measurement and comparison can bring out this advantage even more prominently.

It is also possible to mix serial impedance measurement with parallel comparison to a preset value and vice versa.

Further, according to an exemplary embodiment of the first apparatus according to the first aspect of the present invention, the first apparatus comprises a processor configured to assign a coordinate pair to at least one closed switch. According to an exemplary embodiment of the second apparatus according to the first aspect of the present invention, the second apparatus comprises means for assigning a coordinate pair to at least one closed switch. The means for assigning a coordinate pair to at least one closed switch can for example comprise a processor configured to assign a coordinate pair to at least one closed switch. It is noted that, in the following, whenever it is referred to processor configured to assign a coordinate pair to at least one closed switch, it is, unless otherwise stated, also referred to the means for assigning a coordinate pair to at least one closed switch. However, it is to be understood that the respective terms are not identical, but that their meanings may overlap with regard to certain aspects. According to an exemplary embodiment of the method according to the second aspect of the present invention, the method further comprises assigning a coordinate pair to at least one closed switch. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium further comprises instructions operable to cause a processor to assign a coordinate pair to at least one closed switch. Likewise, an exemplary embodiment of the program according to the fifth aspect of the present invention can comprise causing a processor to assign a coordinate pair to at least one closed switch.

Without loss of generality, it will be in the following referred to a coordinate pair as comprising an x-coordinate and a y-coordinate, wherein a x-coordinate is a coordinate on an axis extending in a first direction and an y-coordinate is a coordinate on an axis perpendicular to the x-axis. If, for instance, there is a single read-out line provided, certain applications might only require that a coordinate on an axis along the read-out line is assigned to a closed switch of said read-out line. In this scenario it can be thought of the assigned coordinate pair as a coordinate pair wherein one of the coordinates, namely the coordinate not related to the axis along the read-out line, is permanently set to zero. An advantage of performing a coordinate assignment can be that abstraction from position characterization in terms of the indices of closed switches, i.e. referring to a certain as the, for instance, third switch on the fifth read-out line, is rendered possible.

Further, according to exemplary embodiments of all aspects of the present invention, the read-out lines of the plurality of read-out lines are arranged in parallel. To facilitate explanation of exemplary embodiments of the present invention, and unless otherwise stated, it is in the following assumed that the read-out lines of the plurality of read-out lines are arranged in parallel. Moreover, it is established for the remainder of the present application that a y-coordinate is a coordinate along an axis extending in the direction of the read-out lines and an x-coordinate is a coordinate on an axis perpendicular to the y-axis.

Simplified coordinate calculation can be an advantage of a parallel arrangement of a plurality of read-out lines. If, for instance, the read-out lines have the same configuration and the second switch—independently from the end of the read-out line from which counting starts—of any of the read-out lines is closed, the y-coordinate assigned to the closed switch may be the same independently of the read-out line actually comprising said closed switch. In consequence, a lookup table used for coordinate mapping can manage on a reduced number of entries, thereby saving storage memory and potentially speeding up coordinate assignment.

Assigning a coordinate pair to at least one closed switch may correspond to assigning a coordinate pair to a combination of closed switches in some exemplary embodiments according to all aspects of the present invention. As an object has a certain size, depending on the arrangement of the read-out lines it may happen that the object is present in the vicinity of more than one switch simultaneously, thus causing two or more switches to close. The plurality of closed switches can be provided on a single read-out line or it can span several read-out lines. An area covering every switch that is closed because of the presence of the same object is in the following referred to as a closing area. If an embodiment of the invention is employed in the field of touch screens, it can be more precisely referred to the closing area as a touch area. Benefit can be drawn from providing the capability of assigning a coordinate pair to a combination of closed switches if coordinate assignment is desired in such a scenario.

In an exemplary embodiment according to all aspects of the present invention, assigning a coordinate pair to a combination of closed switches involves selecting a read-out line of a plurality of read-out lines. Various approaches to determine which coordinate pair should be assigned to a given combination can be thought of. In a scenario in which several read-out lines simultaneously exhibit closed switches, one of these read-out lines can be selected. The assigned coordinate pair may then be a coordinate pair describing a position lying on the selected read-out line. Deciding whether any of the switches of the read-out line is closed can in some cases be based on a single impedance comparison. To this end, it may suffice to compare the measured impedance of the read-out line to a preset value corresponding to the value the impedance of the read-out line assumes if none of the switches of its electrical circuit segments is closed.

For read-out lines arranged in parallel and using the nomenclature introduced above, the x-coordinate of the coordinate pair can be obtained by selecting a read-out line. Of course, it is as well possible to select several read-out lines and to consider the closed switches of these read-out lines in determining the coordinates of the coordinate pair that is assigned to the given combination of closed switches. An advantage of selecting a read-out line can be a reduction of the required computation capacities or a faster determination of the coordinate pair due to a reduction of the number of switches that are considered in determining the coordinates of the coordinate pair.

No limitations pertain to the applied selection criterion. Random selection, for instance, can be the strategy of choice for certain applications. As random selection does not necessarily have to involve taking into the arrangement of the closed switches, random selection can enable rapid coordinate assignment. Random selection of read-out lines may cause different coordinate pairs to be assigned to the same combination of closed switches each time it is performed. If measuring impedances and comparing them to preset values is performed sequentially for a plurality of read-out lines, another possible selection technique may comprise selecting only the first read-out line that is found to comprise a closed switch, thus speeding up read-out line selection. Combining switch selection with other coordinate assignment strategies is also feasible.

Assigning a coordinate pair to a combination of closed switches can involve averaging coordinates of a plurality of switches in exemplary embodiments according to all aspects of the present invention. For example, the computation of the y-coordinate of the coordinate pair that is assigned to the combination of closed switches can be carried out by averaging the y-coordinates of each of the closed switches. Averaging may be based on any existing averaging approach. Besides of computing the mean value or the median value, averaging may also comprise assigning weights to closed switches. The weights may control the influence of each closed switch on the coordinates of the coordinate pair assigned to the combination of closed switches. An advantage of employing averaging techniques such as mean value computation for assigning a coordinate pair can be that the coordinate pair does not necessarily have to represent a position that is located exactly at the position of a switch but also positions in between switches. Put differently, continuous coordinates can be assigned, thus expanding the set of possible coordinate values significantly.

Benefits may also arise from coordinate averaging due to elimination of outliers. Detecting which switch along a read-out line is closed by impedance measurement can be erroneous for various reasons. A first possible error source may be that measuring the impedance of a read-out line may be afflicted with a limited accuracy. The same holds for the comparison of the measured impedance of a read-out line to a preset value corresponding to an allowable value of the impedance of the read-out line. In consequence, wrong conclusion might be drawn regarding the determination of which of the switches is closed.

In some exemplary embodiments of the present invention, measuring the impedance of a read-out line involves supplying electrical power to an electrical circuit segment of the read-out line. A power supply, for instance in the form of a constant voltage source, can be electrically coupled to the first and the second longitudinal arm of the first electrical circuit segment of the read-out line. According to Ohm's law, if two or more impedances are in parallel, the current that enters the combination will be split between them in inverse proportion to their impedances. Two or more impedances connected in parallel can thus be referred to as a current divider. If the lateral arm of said first electrical circuit segment that comprises the switch has a negligible electrical impedance if the switch is closed, while the impedance of the second electrical segment circuit arranged downstream from the power supply is non-negligible, no significant portion of the electrical current may flow trough the second electrical circuit segment. Hence, the impedance of the second electrical circuit segment may not contribute to the measured impedance of the read-out line. In particular, the impedance of the electrical component of a longitudinal arm of the second electrical circuit segment does not contribute to the measured impedance of the read-out line. It may thus not be possible to determine whether the switches of both the first and the second electrical circuit segment are closed or whether only the switch of the first electrical circuit segment is closed. Due to this condition, in the exemplary embodiment of the present invention currently discussed, a coordinate pair is assigned to the combination of closed switches of the read-out line, and potentially to the closed switches of other read-out lines, without consideration of the closed switch of the second electrical circuit segment of the read-out line. This effect may be called current divider effect.

It is noted that the current divider effect may have an influence on the probability of a certain measured impedance comparison yielding a positive result. Namely, the further downstream from the power supply an electrical circuit segment is arranged in a cascade of electrical circuit segments the more improbable it can be that the measured impedance corresponds to the impedance the read-out line would exhibit if only the switch of the lateral arm of said electrical circuit segment, and potentially of other electrical circuit segments even further downstream, were closed. This is due to the fact that a single closed switch in an electrical circuit segment arranged closer to the power supply causes closed switches of electrical circuit segments further downstream to not affect the measured impedance.

Mitigation of the current divider effect can be attained in exemplary embodiments of the invention by averaging coordinates of a plurality of switches. As an example, along a first read-out line comprising a plurality of electrical circuit segments, the switch of the second electrical circuit segment seen from the power supply, in the following named second switch, and the switch of the third electrical circuit segment (third switch) are closed. Based on the comparison of the measured impedance of the first read-out line to a preset value corresponding to an allowable value of the impedance of the first read-out line, it is only detected that the switch of the first electrical circuit segment is closed because of the current divider effect. Depending on the placement of the object that causes the second switch and the third switch of the first read-out line to close with respect to a second provided read-out line, only the third switch of the second read-out line can be closed. Averaging, for example by computing the mean value of the y-coordinates that would be assigned to each of the switches if considered separately, may yield a coordinate pair that reflects the position of the object present in the vicinity of the closed switches more closely.

Comparing the measured impedance of a read-out line to a preset value corresponding to an allowable value of the impedance of the read-out line can be performed effectively if the current divider effect is kept in mind. It may be advisable to choose as a preset value for the first comparison the impedance the read-out line assumes if the switch in the lateral arm of the first electrical circuit segment downstream from a power supply is closed. In a subsequent step, the measured impedance can be compared to a preset value corresponding to the impedance the read-out line assumes if solely the switch in the lateral arm of the second electrical circuit segment is closed.

By starting with the first electrical circuit segment downstream from the power supply and the proceeding further downstream, preset values having a high probability of yielding a positive comparison result are compared to the measured impedance prior to preset values having a lower probability of yielding a positive comparison result. Thus, the probability that an early comparison yields a positive result is increased and it may be likely that the overall number of required comparison steps is reduced since comparison to preset values can cease after having obtained a positive comparison result.

A combination of averaging coordinates of a plurality of closed switches and selecting a read-out line can be taken advantage of in some exemplary embodiments according to all aspects of the present invention. As an example, in a first step several read-out lines can be selected and in a second step averaging the coordinates of the closed switches of the selected read-out lines can be performed. Compared to averaging the coordinates of the closed switches of every read-out line, considering only the switches of the selected read-out lines may yield enhanced coordinate assignment performance.

According to an exemplary embodiment of all aspects of the present invention, assigning a coordinate pair to a combination of closed switches involves selecting the pair of read-out lines of all read-out lines comprising a closed switch that has a maximum distance to each other. In case of a plurality of equally configured read-out lines being arranged in parallel as described above, selecting the pair of read-out lines of all read-out lines comprising a closed switch having a maximum mutual distance corresponds to selecting the read-out line comprising the switch with the lowest x-coordinate and the read-out line comprising the switch with the highest x-coordinate. The x-coordinate of the coordinate pair to be assigned to the given combination of switches may be determined by calculating the mean value of the x-coordinates of both read-out lines. They are identical to the coordinates of the switches of these read-out lines in the example presently described. Determination of the x-coordinate may then not require more than one impedance measurement and one comparison of the measured impedance to a preset value per read-out line as already explained. Solely determining whether a read-out line has a closed switch can be seen as obtaining a binary value. In a subsequent step, it can then be determined which of the switches of the selected read-out lines is closed and another mean value calculation may follow in order to determine the y-coordinate of the coordinate pair to be assigned to the combination of closed switches.

Among the advantages of this approach can be not only providing the capability of quickly calculating the coordinate pair, but also a more accurate representation of the position of the object present in the vicinity of the closed switches. For example, the object may be positioned diagonally with respect to the direction in which a plurality of equally spaced and identically configured read-out lines arranged in parallel extends, wherein the plurality of read-out lines are configured and arranged so that switches with corresponding indices have the same y-coordinate, thereby causing switches on three adjacent read-out lines to close.

In the present example, on the first of the three read-out lines the first and the second switch seen from a power supply used in measuring the impedance of said read-out line have the object present in their vicinity and are thus closed. Next to the first read-line, on the second read-out line, the second and the third switch are closed due to the presence of the object, while on the third read-out line the third and the fourth switch are closed. Because of the current divider effect, only taking into account the first read-out line could yield the first switch of said read-out line determining the coordinates of the coordinate pair assigned to the given combination of closed switches. On the other hand, selecting the pair of read-out lines of the three read-out lines that have a maximum mutual distance, in the present example the first and the third read-out line, and incorporating averaging into assigning a coordinate pair to the combination of closed switches will in turn result in another coordinate pair. Said coordinate pair has the coordinate of the second of the three read-out lines as the x-coordinate and the coordinate of the second switch, independent of whether the mean or the median value of the coordinates of the detected closed switches is computed, as the y-coordinate. Hence, the coordinate pair calculated in the described manner is closer to the center of the area covering the closed switches than the coordinated pair calculated from the first read-out only. Similarly, the achieved result is also better in that respect in comparison to the coordinate pair that could be obtained by selecting the first and the second read-out line and then performing averaging.

Further, according to an exemplary embodiment of the first apparatus according to the first aspect of the present invention, the first apparatus comprises a processor configured to assign a plurality of coordinate pairs to a combination of closed switches and the analyzer is configured to measure the impedances of a pair of read-out lines from opposed ends of the read-out lines. According to an exemplary embodiment of the second apparatus according to the first aspect of the present invention, the second apparatus comprises means for assigning a plurality of coordinate pairs to a combination of closed switches and means for measuring the impedances of a pair of read-out lines from opposed ends of the read-out lines. The means for assigning a plurality of coordinate pairs to a combination of closed switches can for example comprise a processor configured to assign a plurality of coordinate pairs to a combination of closed switches. The means for measuring the impedances of a pair of read-out lines from opposed ends of the read-out lines can for example comprises an analyzer configured to measure the impedances of a pair of read-out lines from opposed ends of the read-out lines. It is noted that, in the following, whenever it is referred to a processor configured to assign a plurality of coordinate pairs to a combination of closed switches or to an analyzer configured to measure the impedances of a pair of read-out lines from opposed ends of the read-out lines, it is, unless otherwise stated, also referred to the means for assigning a coordinate pair to a closed switch. However, it is to be understood that the respective terms are not identical, but that their meanings may overlap with regard to certain aspects. According to an exemplary embodiment of the method according to the second aspect of the present invention, the method further comprises assigning a plurality of coordinate pairs to a combination of closed switches and measuring the impedances of a pair of read-out lines from opposed ends of the read-out lines. In consequence, an exemplary embodiment of the program according to the fourth aspect of the invention, the program comprising program code for performing the method according to the second aspect of the present invention, when the program is executed on a processor, may exhibit a corresponding feature. According to an exemplary embodiment of the computer-readable medium according to the third aspect of the present invention, the computer program stored on the computer-readable medium further comprises instructions operable to cause a processor to assign a plurality of coordinate pairs to a combination of closed switches and to control an analyzer to measure the impedances of a pair of read-out lines from opposed ends of the read-out lines. Likewise, an exemplary embodiment of the program according to the fifth aspect of the present invention can comprise causing a processor to assign a plurality of coordinate pairs to a combination of closed switches and to cause an analyzer to measure the impedances of a pair of read-out lines from opposed ends of the read-out lines.

To measure the impedances of a pair of read-out lines from opposed ends of the read-out lines, a power supply can be arranged at a first end of a first read-out line, while a power supply of a second read-out line is arranged at an end of that read-out line opposed to the first end of the first read-out line. Consequently, if an object is present in the vicinity of a plurality of switches covering both the first and the second read-out line, the current divider effect affects the measured impedances differently for the first and the second read-out line. Namely, in an exemplary embodiment, if a plurality of switches of the first read-out line is closed, comparing the measured impedance to a preset value corresponding to an allowable value of the impedance of the read-out line will only allow to infer that the closed switch of the plurality of closed switches that is arranged closest to the power supply used in measuring the impedance is closed. The same effect may occur with regard to the second read-out line. Since measuring the impedance of the second read-out line is performed from another end, the bias occurring regarding determination which of the switches along the read-out line is closed is different for the first and for the second read-out line.

Current divider effect mitigation may also involve providing a power supply at each end of a read-out line, thereby enabling impedance measurement from two ends and thus permitting to obtain more accurate information on which switches are closed.

A plurality of read-out lines can comprises a plurality of pairs of read-out lines whose impedances are measured from opposed ends of the read-out lines. The ends from which the impedances of a plurality of read-out lines are measured can for instance alternate for adjacent read-out lines. Dividing the read-out lines into two groups based on the ends from which their impedances are measured, one may also say that two distinct read-out circuits are provided.

If a plurality of coordinate pairs can be assigned to a plurality of closed switches, it can be possible to describe the presence of several objects in the vicinity of the switches of the read-out lines and to assign a coordinate pair to each set of switches closed due to the presence of one of the objects. In other words, multiple closing area coordinate assignment can be performed. Read-out lines arranged closely to one another increase the probability that the presence of an object causes switches of several adjacent read-out lines to close. As the analyzer is configured to measure the impedances of a pair of read-out lines from opposed ends of the read-out lines, assigning accurate coordinate pairs to different closing areas comprising closed switches on the same read-out lines can be enabled. Averaging coordinates of the switches for which it can be deduced from the comparison results that they are closed may then yield a more accurate representation of the combination of closed switches of a closing area by the coordinate pair that is assigned to it.

According to an exemplary embodiment of all aspects of the present invention, assigning a coordinate pair to a combination of closed switches involves selecting two read-out lines of a plurality of read-out lines, each selected read-out line having a closed switch, wherein for each selected read-out line an adjacent read-out line does not have a closed switch or the distance of the closed switch of the adjacent read-out line along an axis extending in the direction of the read-out lines to the closed switch of the selected read-out line exceeds a preset limit.

The above selection scheme may yield selection of the two outmost read-out lines having a closed switch belonging to a certain closing area. The two outmost read-out lines can delimit the closing area to opposite sides.

For example, a read-out line selected as the leftmost read-out line having a closed switch belonging to a certain closing area may not have a left adjacent read-out line having a closed switch. Alternatively, if the left adjacent read-out line has a closed switch, the distance of the closed switch of the left adjacent read-out line along an axis extending in the direction of the read-out lines to the closed switch of the selected read-out line has to exceed a preset limit. If the read-out lines have a similar configuration, a closed switch of the left adjacent read-out line can be considered to meet this requirement if the difference of the indices of the switches along the read-out lines exceeds a preset limit. One may also say that in this case, the switches of the two read-out lines are located comparatively far away from one another on the y-axis. The left adjacent read-out line may of course be selected in the process of a assigning a coordinate pair to a combination of closed switches belonging to another closing area. Accordingly, the right most read-out line having a closed switch belonging to the respective closing area may either not have a right adjacent read-out line having a closed switch or the distance of the closed switch of the right adjacent read-out line along an axis extending in the direction of the read-out lines to the closed switch of read-out line exceeds a preset limit.

Thus, for each of a plurality of closing areas the two outmost read-out lines can be determined. In a further step, the coordinates of the closed switches of the two outmost read-out lines of each closing area can be averaged, for instance by computation of the mean coordinate values, to obtain the coordinate pair that is assigned to the combination of closed switches of the respective closing area.

As it can be likely that two closing areas span a pair of read-out lines, it can be advantageous to measure the impedances of the adjacent read-out lines from opposed ends of the read-out lines since it may allow assigning a coordinate pair to each of the two closing areas that describes the respective closing area sufficiently accurate.

Due to the current divider effect, it may occur that it can only be inferred from the comparison of the measured impedance of a read-out line to a preset value corresponding to an allowable impedance of the read-out line that a certain switch of a read-out line is closed even if other switches of said read-out line are closed as well. It is readily clear that in this case only the switches for which it has been concluded from the comparison results that they are closed may be taken into account in the selection process.

In an exemplary embodiment, the first and the second apparatus according to the first aspect of the present invention comprise an antenna. One of the advantages of these embodiments can be that an antenna can allow wireless communication with other devices. For instance, information on the state of the switches of a read-out line may then be forwarded to other devices, thus allowing a user communicating by placing an object in the vicinity of a switch of a read-out line.

The exemplary embodiments described above for all aspects of the invention shall be understood to be disclosed in all possible combinations with each other.

It is to be noted that the above description of embodiments of the present invention is to be understood to be merely exemplary and non-limiting.

These and further aspects of the invention will be apparent from and elucidated with reference to the detailed description presented hereinafter.

DETAILED DESCRIPTION OF EXEMPLARY EMBODIMENTS OF THE PRESENT INVENTION

Figure 1:
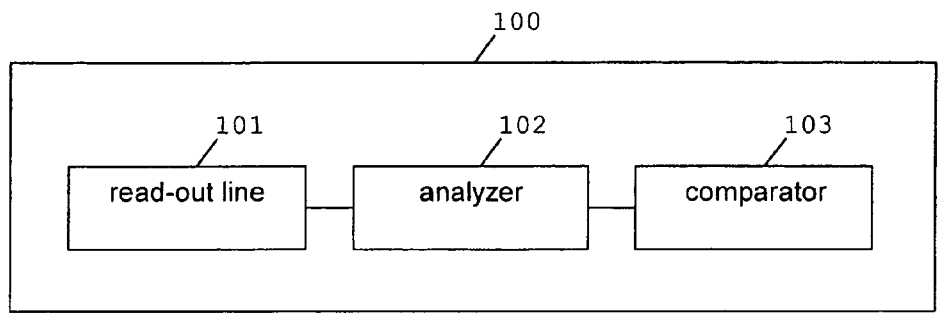
FIG. 1: a schematic illustration of a first exemplary embodiment of an apparatus according to the first aspect of the present invention.

FIG. 1 shows a schematic illustration of a first exemplary embodiment of an apparatus according to the first aspect of the present invention.

The apparatus 100 comprises a read-out line 101, an analyzer 102 and a comparator 103.

The read-out line 101 comprises two cascaded electrical circuit segments (not shown), each electrical circuit segment comprising two longitudinal arms, wherein one of the longitudinal arms comprises an electrical component, and a lateral arm comprising a switch configured to close in the presence of an object in the vicinity of the switch. In the exemplary embodiment shown in FIG. 1, the analyzer 102 is configured to measure the impedance of the read-out line 101. The comparator 103 is configured to compare the measured impedance of the read-out line to a preset value corresponding to an allowable value of the impedance of the read-out line 101.

The analyzer 102 may also be seen as means for measuring the impedance of the read-out line 101 and the comparator 103 may also be seen as means for comparing the measured impedance of the read-out line to a preset value corresponding to an allowable value of the impedance of the read-out line.

Figure 2A:
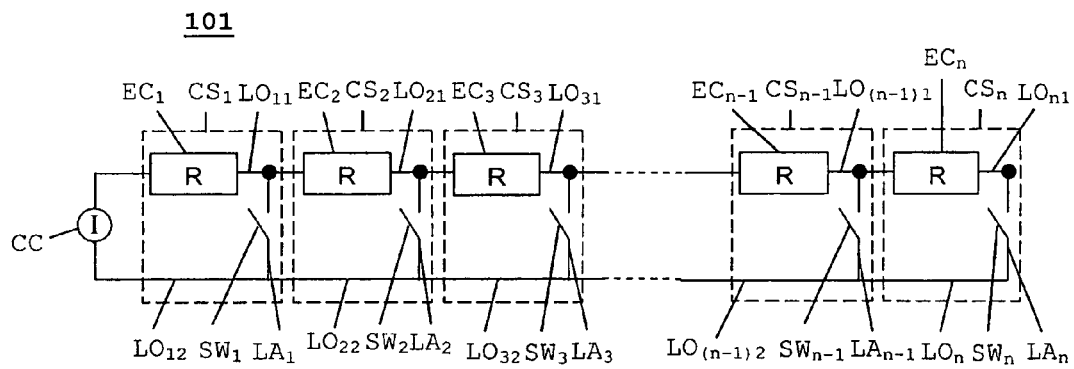
FIG. 2a: a schematic illustration of an equivalent circuit of the read-out line of the first exemplary embodiment of an apparatus according to the first aspect of the present invention having a power supply connected thereto.

FIG. 2a shows a schematic illustration of an equivalent circuit of the read-out line 101 of the first exemplary embodiment of an apparatus according to the first aspect of the present invention having a power supply connected thereto.

The read-out line 101 comprises n cascaded electrical circuit segments $CS_i$ with i being an integer in the range from 1 to n. Each electrical circuit segment $CS_i$ comprises two longitudinal arms $LO_{i1}$ and $LO_{i2}$, wherein one of the longitudinal arms, in this case the longitudinal arm $LO_{i1}$, comprises an electrical component $EC_i$, and a lateral arm $LA_i$ comprises a switch $SW_i$ configured to close in the presence of an object in the vicinity of the switch $SW_i$.

To the longitudinal arms $LO_{11}$ and $LO_{12}$ of the first electrical circuit segment $CS_1$ a constant current source CC, i.e. a power supply, is connected. It is not forming part of the read-out line, but is considered as a component of the analyzer 102 shown in FIG. 1.

In the exemplary embodiment of a read-out line presently discussed, the electrical circuit segments $CS_i$ are cascaded by electrically coupling the first longitudinal arms $LO_{i1}$ of adjacent electrical circuit segments $CS_i$ to each other and by electrically coupling the second longitudinal arms $LO_{i2}$ of adjacent electrical circuit segments $CS_i$ to each other.

The electrical components $EC_i$ are ohmic resistors. All of them have identical ohmic resistances R. In the equivalent circuit of the read-out line 101 shown in FIG. 2a, the line segments of the longitudinal arms $LO_{i1}$ and $LO_{i2}$ as well as the line segments of the lateral arms $LA_i$ represent ideal conductors. Their ohmic resistance, capacitance and inductance are thus zero. With the electrical components $EC_i$ being ohmic resistors, the impedance of the read-out line 101 is purely ohmic, independent from the states of the switches $SW_i$.

The switches $SW_i$ can be based on any pertinent technology as long as they are configured to close in the presence of an object in their vicinity. Without loss of generality, it is in the following assumed that the switches $SW_i$ are configured to close if a mechanical force is exerted upon them by means of an object contacting the respective switch either directly or indirectly, i.e. via an intervening object. In the scenario depicted in FIG. 2a all of the switches $SW_i$ are open.

The switches $SW_i$ may also be considered as means for closing in the presence of means for inputting in their vicinity.

If all switches $SW_i$ are open as shown in FIG. 2a, there is no closed electrical path provided that includes the constant current source CC. Thus, seen from the constant current source CC, the impedance of the read-out line 101 is infinite.

Closing only switch $SW_1$ alters the situation. Electrical current can pass through a closed switch. Hence, the electrical current provided by constant current source CC can flow through the longitudinal arm $LO_{11}$ comprising the ohmic resistor $EC_1$, the lateral arm $LA_1$ comprising the closed switch $SW_1$ and the longitudinal arm $LO_{12}$ of the first electrical circuit segment $EC_1$. The impedance of the read-out line 101 then assumes the value R. It is purely ohmic, i.e. its imaginary part is zero.

The analyzer 102 shown in FIG. 1 may then for example measure the impedance of the read-out line 101 by measuring the voltage between the first longitudinal arm $LO_{11}$ and the second longitudinal arm $LO_{12}$ of the first electrical circuit segment $CS_1$ directly behind the constant current source CC. Dividing the measured voltage by the magnitude of the current provided by the constant current source CC yields the impedance of the read-out line 101.

If, for instance, not the switch $SW_1$ of the first electrical circuit segment $CS_1$ but the switch $SW_2$ of the second electrical circuit segment $CS_2$ is closed, another closed electrical path is formed. Hence, the electrical current provided by constant current source CC can flow through the longitudinal arms $LO_{11}$ and $LO_{21}$, the lateral arm $LA_2$ and the longitudinal arms $LO_{12}$ and $LO_{22}$. Hence, the electrical current also flows through the electrical components $EC_1$ and $EC_2$. Consequently, measurement of the impedance of the read-out line 101 will show that that it has the value 2R. In other words, the electrical current provided by the constant current source CC can flow through the second electrical circuit segment $CS_2$ that is arranged further downstream from the constant current source CC than the first electrical circuit segment $CS_1$. This involves a change of the measured impedance of the read-out line.

The values R and 2R are both allowable values of the impedance of the read-out line 101. If, in the two cases described above, the measured impedances are compared to preset values corresponding to allowable values of the impedance of the read-out line 101, comparison to the value R will yield a positive result in the first case and comparison to the value 2R will yield a positive result in the second case. Thus, it can be inferred from the comparison result, which of the switches $SW_1$ and $SW_2$ is closed. It may then be concluded that an object is present in the vicinity of the switches $SW_1$ and $SW_2$, respectively.

Measuring the impedance of the read-out line 101 according to the present invention and comparing the measured impedance to a preset value can enable detection of a closed switch $SW_i$ anywhere along the read-out line 101. An advantage can thus be, that determining which of the switches $SW_i$ is closed may only have to involve a single impedance measurement. In consequence rapid determination which of the switches $SW_i$ is closed can be enabled. This can be especially beneficial if the apparatus 100 is employed in a user interface, where positioning of an object is used to cause a switch to close in order to input information into a device operationally coupled to the user interface. Information input with low latency can become possible.

In the present example, closing one of the switches $SW_i$ while the other switches remain in an open state causes the ohmic resistance of the read-out line to change. It may thus suffice to limit impedance measurement to measuring the ohmic resistance of the read-out line 101 in order to conclude which of the switches is closed. Therefore, measuring the impedance of the read-out 101 line may comprise measuring the ohmic resistance of the read-out line 101 only. Measurement of the inductance and the capacitance of the read-out line does not have to be carried out. It is not necessary to determine the imaginary part of the impedance of the read-out line 101. As set forth above, impedance measurement can then be performed easily and may yield the possibility of employing a simply structured analyzer that can be manufactured at low costs.

Closing more than one switch $SW_i$ at a time may have the effect that the measured impedance of the read-out line 101 assumes the value that it would also assume if only the switch $SW_i$ of the plurality of closed switches of the electrical circuit segment $CS_i$ located closest to the constant current source CC were closed. For instance, if the switches $SW_1$ and $SW_2$ are closed and the other switches are open, measuring the impedance of the read-out line 101 may indicate that it has the value R. Thus it can be inferred from the comparison result that the Switch $SW_1$ is closed but not that the switch $SW_2$ is also closed.

This effect can be explained by means of Ohm's law. According to Ohm's law, if two or more impedances are connected in parallel, the current that enters the combination will be split between them in inverse proportion to their impedances. Two or more impedances connected in parallel can thus be referred to as a current divider. The electrical components $EC_1$ and $EC_2$ are connected in parallel. The impedance of the closed switch $SW_1$ of the first electrical circuit segment $CS_1$ is negligible, while the impedance of the second electrical segment circuit $CS_2$ arranged downstream from the constant current source CC is non-negligible. Hence, according to Ohm's law, no significant portion of the electrical current will flow trough the second electrical circuit segment $CS_2$. Consequently, the impedance of the second electrical circuit segment $CS_2$ does not contribute to the measured impedance of the read-out line 101. Therefore, not being able to determine for all switches $SW_i$ of the read-out line 101 if they are closed by impedance measurement and comparison to preset values, the preset values corresponding to allowable value of the impedance of the read-out line, may be referred to as the current divider effect.

It is noted that the current divider effect may have an influence on the probability of a certain measured impedance comparison yielding a positive result. Namely, the further downstream from the constant current source CC an electrical circuit segment $CS_i$ is arranged, the more improbable it can be that the measured impedance corresponds to the impedance the read-out line 101 would exhibit if only the switch $SW_i$ of the lateral arm $LA_i$ of said electrical circuit segment $CS_i$, and potentially of other electrical circuit segments $CS_i$ even further downstream, were closed. This is due to the fact that if there is a single closed switch $SW_i$ in an electrical circuit segment $CS_i$ arranged closer to the constant current source CC than closed switches $SW_j$ of other electrical circuit segment $CS_j$, the closed switches $SW_j$ the of electrical circuit segments $CS_j$ further downstream do not affect the measured impedance. Comparing the measured impedance of the read-out line 101 to a preset value corresponding to an allowable value of the impedance of the read-out line 101 can be performed effectively if the current divider effect is kept in mind. It may be advisable to choose as a preset value for the first comparison the impedance the read-out line 101 assumes if the switch $SW_1$ in the lateral arm $LA_1$ of the first electrical circuit segment $CS_1$ downstream from the constant current source CC is closed. In a subsequent step, the measured impedance is compared to a preset value corresponding to the impedance the read-out line 101 assumes if the switch $SW_2$ in the lateral arm $LA_2$ of the second electrical circuit segment $CS_2$ is closed, and so on.

By starting with the first electrical circuit segment $CS_1$ downstream from the constant current source CC and the proceeding further downstream, preset values having a high probability of yielding a positive comparison result are compared to the measured impedance prior to preset values having a lower probability of yielding a positive comparison result. Thus, the probability that an early comparison yields a positive result is increased and it may be likely that the overall number of required comparison steps is reduced since comparison to preset values can cease after having obtained a positive comparison result.

The equivalent circuit of the read-out line 101 that is depicted in FIG. 2a can be the equivalent circuit of a read-out line with an electrical component that comprises an electrical conductor spanning longitudinal arms of a plurality of electrical circuit segments. The electrical conductor can be a continuous conductor having a certain constant ohmic resistance per unit length. In the present example, the electrical components $EC_i$ forming part of the longitudinal arms $LO_{i1}$ of the electrical circuit segments $CS_i$ can, for instance, correspond to the sections of an electrical conductor located between the two lateral arms $LA_i$ that delimit the respective longitudinal arm $LO_{i1}$. Due to the constant ohmic resistance per unit length of the electrical conductor, an equal length of the sections of the electrical conductor results in electrical components $EC_i$ of the equivalent electrical circuit having equal ohmic resistances.

Such an electrical conductor can be employed instead of distinct electrical components, such as surface-mount ohmic resistors used as electrical components $EC_i$. An advantage of employing an electrical component that comprises an electrical conductor spanning longitudinal arms $LO_{i1}$ of the electrical circuit segments $CS_i$ can be that manufacturing costs are lowered compared to, for example, employing surface-mount devices as electrical components. Furthermore, the manufacturing process can be sped up because only a single conductor has to be provided instead of a distinct electrical component for each electrical circuit segment $CS_i$. Thus, the process step of providing an electrical conductor can substitute a plurality of process steps comprising provision of several distinct electrical components.

Figure 2B:
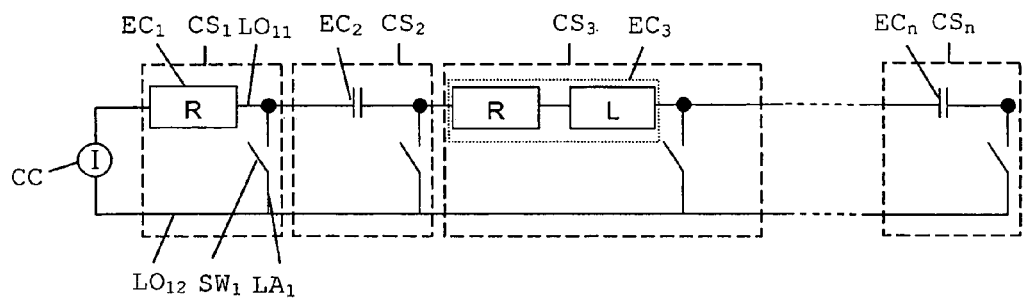
FIG. 2b: a schematic illustration of an equivalent circuit of an alternative exemplary embodiment of a read-out line having a power supply connected thereto.

FIG. 2b shows a schematic illustration of an equivalent circuit of an alternative exemplary embodiment of a read-out line having a power supply connected thereto.

The structure of the read-out line depicted in FIG. 2b is similar to the structure of the read-out line 101 depicted in FIG. 2a. For the sake of clarity, the reference signs are thus not repeated for each electrical circuit segment $CS_i$ and only the differences between the read-out line shown in FIG. 2a and FIG. 2b are explained in detail.

The configuration of the first electrical circuit segment $CS_1$ shown in FIG. 2b correspond to the configuration of the first electrical circuit segment $CS_1$ shown in FIG. 2a. However, the electrical component $EC_2$ of the longitudinal arm $LO_{21}$ of the second electrical circuit segment $CS_2$ has a certain capacity, while its ohmic resistance is negligible. The same applies to the electrical circuit segment $CS_n$. Moreover, it can be derived from FIG. 2b that the electrical component $EC_3$ of the longitudinal arm $LO_{31}$ of the third electrical circuit segment $CS_3$ has a certain ohmic resistance and inductance, while its capacitance is negligible. For this read-out line, it can be necessary to measure not solely the ohmic resistance, the capacitance or the inductance in order to allow concluding which of the switches is closed. Measurement of the complex impedance may have to be performed instead. For example, if only the ohmic resistance is measured, it may be likely that the measured ohmic resistance is the same regardless of whether only the switch $SW_1$ of the first electrical circuit segment $CS_1$ or the switch $SW_2$ of the second electrical circuit segment $CS_2$ is closed because the impedance of the electrical component $EC_2$ is purely imaginary.

Figure 3:
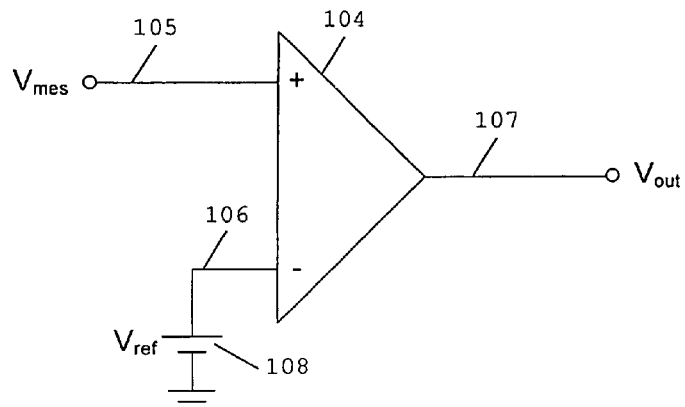
FIG. 3: a schematic illustration of the comparator of the first exemplary embodiment of an apparatus according to the first aspect of the present invention shown in FIG. 1.

FIG. 3 shows a schematic illustration of the comparator 103 of the first exemplary embodiment of an apparatus according to the first aspect of the present invention shown in FIG. 1.

The comparator 103 comprises an operational amplifier 104 having a non-inverting input 105, an inverting input 106 and an output 107. It further comprises a direct voltage source 108 electrically coupled to the inverting input 106.

If the impedance of the read-out line 101 is measured by supplying the read-out line 101 with a constant direct current and measuring the voltage drop $V_{mes}$ across the read-out line 101, comparing the thus measured impedance to a preset value corresponding to an allowable value of the impedance of the read-out line 101 can be carried out by directly comparing the measured voltage $V_{mes}$ to a reference voltage $V_{ref}$ provided by the direct voltage source 108. One could also say that then not just the measured impedance of the read-out line 101 is compared to a preset value corresponding to an allowable value of the impedance of the read-out line 101, but that the products of the respective impedances and the predetermined magnitude of the current supplied by the constant current source CC are compared. In consequence, the division of the measured voltage $V_{mes}$ by the magnitude of the current can be omitted, thus reducing the complexity of the impedance measurement and comparison.

As shown in FIG. 3, the measured voltage $V_{mes}$ is applied to the non-inverting input 105 of the operational amplifier 104, while the reference voltage $V_{ref}$ is applied to the inverting input 106. The output voltage $V_{out}$ of the operational amplifier 104 then corresponds to the difference of the voltages $V_{mes}$ and $V_{ref}$ multiplied by the open-loop gain of the operational amplifier 104. If $V_{out}$ is either zero or falls within a preset tolerance interval around zero, the comparison result is considered to be positive. Identity of the measured impedance of the read-out line 101 and the preset value corresponding to an allowable value of the impedance of the read-out line 101 is then assumed.

Figure 4:
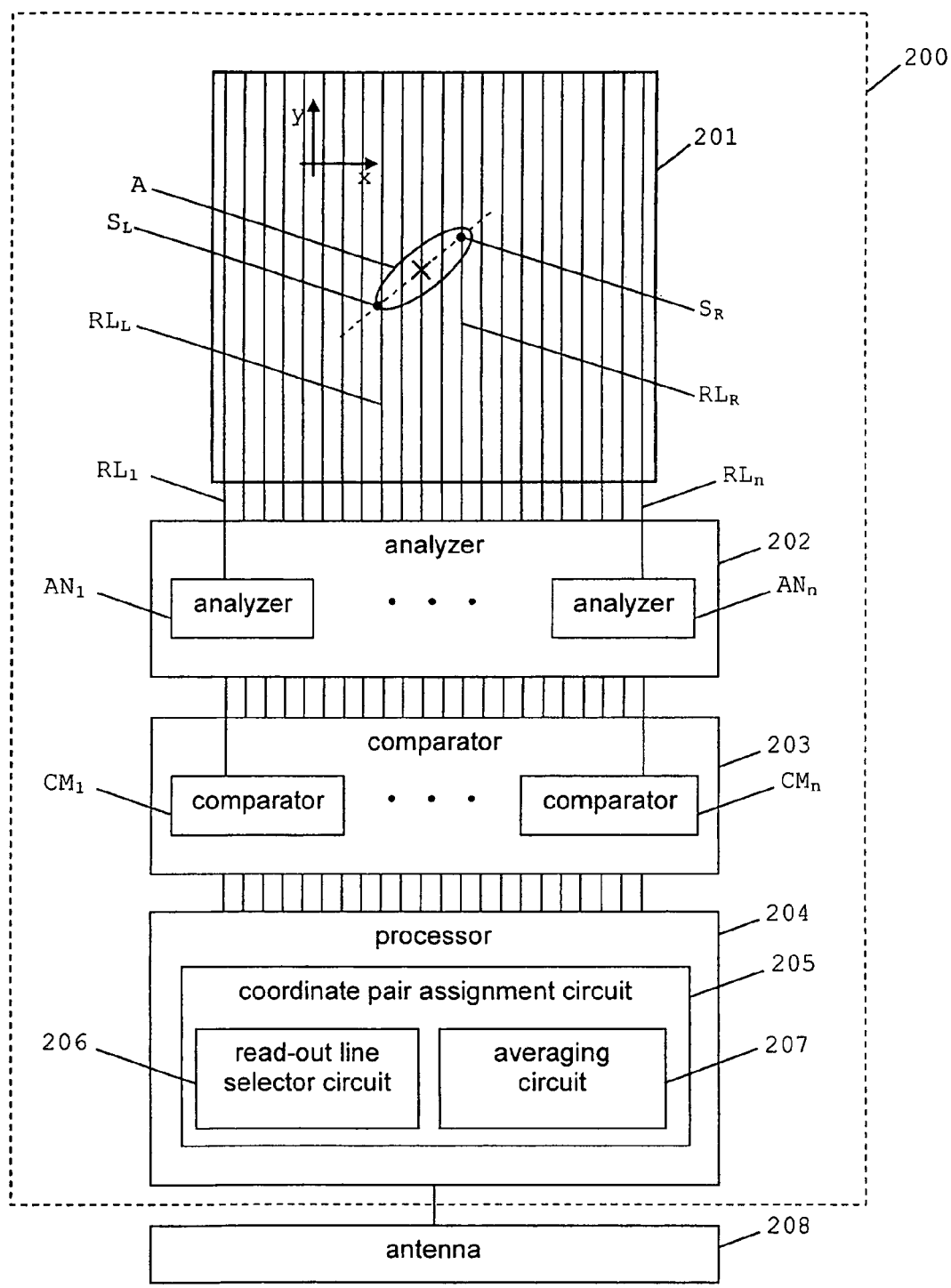
FIG. 4: a schematic illustration of a second exemplary embodiment of an apparatus according to the first aspect of the present invention.

FIG. 4 shows a schematic illustration of a second exemplary embodiment of an apparatus according to the first aspect of the present invention.

The apparatus shown in FIG. 4 comprises a user interface or, more precisely, a touch screen 200 having a touch screen panel (TSP) 201. The touch screen 200 comprises a plurality of read-out lines $RL_i$, with i being an integer in the range from 1 to n. For enhanced clarity, except of the switches $S_L$ and $S_R$, the switches of the read-out lines $RL_i$ are not shown.

Further, the touch screen 200 comprises an analyzer 202, which in turn comprises an analyzer $AN_i$ for each read-out line $RL_i$. Also, a comparator 203 is provided, which comprises for each analyzer $AN_i$ a comparator $CM_i$. As another component, the touch screen 200 comprises a processor 204. A coordinate assignment circuit 205 comprising a read-out line selector circuit 206 and an averaging circuit 207 form part of the processor 204. An antenna 208 is operationally coupled to the touch screen 200.

All of the read-out lines $RL_i$ have the structure shown in FIG. 2a. Hence, the plurality of read-out lines $RL_i$ does not only have a similar configuration, but even the same configuration. Consequently, the set of allowable values of impedances is the same for each read-out line $RL_i$. Benefits may arise from having the same sets of allowable values of the impedances of the read-out lines $RL_i$ in form of reduced memory storage capacities needed to accommodate the preset values for the comparison. In addition, the manufacturing cost can be lowered in contrast to employing read-out lines having various configurations within the same apparatus.

The read-out lines $RL_i$ are arranged in parallel and they are equally spaced. They all have the same length.

The analyzer 202 is configured to measure the impedances of the plurality of read-out lines $RL_i$ parallelly because each analyzer $AN_i$ is configured to measure the impedance of the respective read-out line $RL_i$. Thus, the analyzers $AN_i$ can measure the impedances of the respective read-out lines $RL_i$ independently from one another and simultaneously, i.e. parallelly. Accordingly, the comparator 203 is configured to compare the measured impedances of the read-out lines $RL_i$ to preset values, each preset value corresponding to an allowable value of the impedance of the respective read-out line $RL_i$, parallelly. Again, this is due to the fact that each comparator $CM_i$ of the comparator 203 can compare the impedance of the respective read-out line $RL_i$ measured by the respective analyzer $AN_i$ to a preset value corresponding to an allowable value of the impedance of the respective read-out line $RL_i$ independently.

The read-out lines $RL_i$ all have the structure of the read-out line 101 of the first exemplary embodiment of an apparatus according to the first aspect of the present invention shown in FIG. 1. Also, the analyzers $AN_i$ correspond to the analyzer 102 shown in FIG. 1. Accordingly, the comparators $CM_i$ correspond to the comparator 103 shown in FIGS. 1 and 3. The description of these entities given with respect to FIGS. 1, 2a and 3 thus also apply to the apparatus of FIG. 4.

According to the exemplary scenario depicted in FIG. 4, a plurality of switches is closed due to the presence of an object, such a user's finger or a stylus, in their vicinity. An area covering every switch that is closed because of the presence of the same object is in the following referred to as a closing area. In the figure, the closing area A is represented by an ellipse. The closing area A may also be referred to as a touch area since the user interface 200 depicted in FIG. 4 is a touch screen.

The processor 204 is configured to assign a coordinate pair to at least one closed switch. Namely, it is configured to assign a coordinate pair to a combination of closed switches. For this purpose, it is equipped with the coordinate pair assignment circuit 205 which in turn comprises a read-out line selector circuit 206 and an averaging circuit 207. This allows for assigning a coordinate pair to a combination of closed switches to involve selecting a read-out line $RL_i$ of the plurality of read-out lines $RL_1$ to $RL_n$ and to involve averaging coordinates of a plurality of switches.

The processor 204 may be seen as means for assigning a coordinate pair to a closed switch. Also, it may be considered as means for assigning a coordinate pair to a combination of closed switches. Alternatively, the coordinate assignment circuit 205 may be thought of as such means.

Assignment of a coordinate pair to a combination of closed switches is explained in the following. The analyzer 202 measures the impedances of each of the read-out lines $RL_i$ parallelly. Next, the measured impedances are fed to the comparator 203. There, they are compared to preset values, each preset value corresponding to an allowable value of the impedance of the respective read-out line $RL_i$.

First, the measured impedances are compared to a preset value corresponding to the value the impedances of the read-out lines $RL_i$ assume if none of the switches of its electrical circuit segments are closed. As all of the read-out lines $RL_i$ have the same configuration, this preset value is the same value for all read-out lines $RL_i$. A positive comparison result for a read-out line $RL_i$ then indicates that none of its switches are closed. In other words, it shows that the read-out line $RL_i$ is not activated after only one comparison for each read-out line $RL_i$.

The read-out line selector circuit 206 is configured to select the pair of read-out lines of all read-out lines $RL_i$ comprising a closed switch that has a maximum distance to each other. In the figure, all read-out lines $RL_i$ that cross the touch area A comprise a closed switch. Thus, the read-out lines to be selected have to be among these read-out lines. As the comparison explained above has already been performed, the information which of the read-out lines $RL_i$ is activated is available to the read-out line selector circuit 206. Selecting the pair of read-out lines having a maximum distance to one another then corresponds to selecting the leftmost read-out line $RL_L$ that has a closed switch and the rightmost read-out line $RL_R$ that has a closed switch.

The impedances of the read-out lines $RL_L$ and $RL_R$ are then again compared to preset values corresponding to allowable values of the impedances of the read-out lines $RL_L$ and $RL_R$ by comparator 203. As already explained with respect to FIG. 2a, it can then be inferred from the comparison results which of the switches of the read-out lines $RL_L$ and $RL_R$ are closed. First determining which of the read-out lines $RL_1$ to $RL_n$ has a closed switch, selecting a pair of these read-out lines and not till then determining which of the switches is closed can speed up the process of coordinate assignment because less comparison may have to be performed.

In the present example, it can be detected that the switch $S_L$ of the read-out line $RL_L$ and the switch $S_R$ of the read-out line $RL_R$ is closed. Of course, due to the current divider effect, other switches of the read-out lines $RL_L$ and $RL_R$ may also be closed, while it may not be possible to derive this from the comparison results.

A coordinate system having a y-axis extending in the direction of the read-out lines $RL_i$ and an x-axis perpendicular to the y-axis as shown in FIG. 4 can be defined. The coordinate system shown in FIG. 4 has merely the purpose of illustrating the direction of the axes. In particular, the origin of the coordinate system can be located anywhere, for instance at the bottom left corner of the touch screen panel 201.

In the averaging circuit 207, a lookup table of the x-coordinates and the y-coordinates of the position of each of the switches of the read-out lines $RL_i$ is stored. Having determined that the switches $S_L$ and $S_R$ of the selected read-out lines $RL_L$ and $RL_R$ are closed, the processor 204 can access the lookup table comprising the coordinates of the closed switches $S_L$ and $S_R$ and assign the respective coordinate pairs to them since it is configured to assign a coordinate pair to at least one closed switch. The averaging circuit 207 then averages the coordinates of the switches $S_L$ and $S_R$ by calculating the mean value of the x-coordinates of the two coordinate pairs and the mean value of the y-coordinates of the two coordinate pairs. The obtained coordinate pair is then assigned to the combination of closed switches. In the figure the position corresponding to the obtained coordinate pair is indicated by a cross. The x-coordinate assigned to the combination of closed switches is contingently located on a read-out line $RL_i$. It is noted that it is located close to the center of the ellipse. Approximation of the center of a touch area A assigned coordinate pair may be the goal in many applications. The y-coordinate of the obtained coordinate pair is a better approximation of the y-coordinate of the ellipse than the y-coordinates of the switches $S_L$ and $S_R$. Applying the criterion of touch center coordinate approximation, in the present case, averaging increases the accuracy of the assigned coordinate pair compared to simply assigning the coordinates of one of the switches $S_L$ or $S_R$ to the combination of closed switches.

Furthermore, due to incorporating averaging techniques such as mean value computation into assigning a coordinate pair, the thereby obtained coordinate pair does not necessarily have to represent a position that is located exactly at the position of a switch, but can also represent positions in between switches. Put differently, continuous coordinates can be assigned, thus expanding the set of possible coordinate values significantly. Benefits may also arise from coordinate averaging due to elimination of outliers. Detection of a closed switch can be erroneous for various reasons. A first possible error source can be that measuring the impedance of a read-out line $RL_i$ may be afflicted with a limited accuracy. The same holds for the comparison of the measured impedance of a read-out line $RL_i$ to a preset value corresponding to an allowable value of the impedance of the read-out line $RL_i$. In consequence, wrong conclusion might be drawn regarding the determination of which of the switches is closed.

Selecting a read-out line $RL_i$ or a pair of read-out lines can cause a reduction of the required computation capacities or a faster determination of the coordinate pair because of a reduction of the number of switches that are considered in determining the coordinates of the coordinate pair that is assigned to a combination of closed switches. Averaging, for example computation of the mean value of several coordinate values, can be completed more quickly if a reduced number of values is considered. This can also be achieved by selecting only some of the read-out lines $RL_i$ and discarding others.

An advantage of performing a coordinate assignment can be that abstraction from position characterization in terms of the indices of closed switches is rendered possible. For example, this may be necessary for some software applications that are controlled by a user by means of the touch screen 200. They may not be able to process other input data than coordinate pairs.

Simplified coordinate calculation can be an advantage of a parallel arrangement of a plurality of read-out lines combined with employing read-out lines $RL_i$ having the same configuration. If, for instance, the second switch—independently from the end of the read-out line from which counting starts—of any of the read-out lines $RL_1$ to $RL_n$ is closed, the y-coordinate assigned to the closed switch is the same for each read-out lines $RL_i$. In consequence, a lookup table used for coordinate assignment can manage on a reduced number of entries, thereby saving storage memory and potentially speeding up coordinate assignment. By arranging the read-out lines $RL_i$ with equal space in between, a corresponding effect may be obtained regarding the x-coordinate.

The apparatus shown in FIG. 4 comprises an antenna 208. As an example, the antenna 208 can be used for forwarding information on the state of the switches of the read-out lines $RL_1$ to $RL_n$ to other devices, thus allowing a user communicating by placing an object in the vicinity of a switch of a read-out line $RL_i$. If the apparatus forms part of a mobile device, for instance a mobile phone, text messages can be inputted by means of the touch screen 200 and transmitted to another mobile phone using the short messages service (SMS) protocol.

Figure 5:
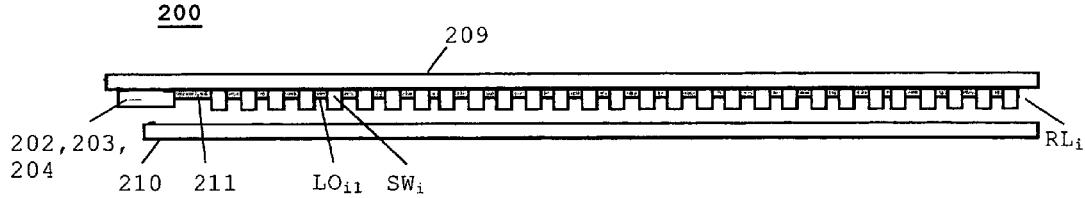
FIG. 5: a sectional view of the touch screen forming part of the second exemplary embodiment of an apparatus according to the first aspect of the present invention schematically illustrated in FIG. 4.

FIG. 5 shows a sectional view of the touch screen 200 forming part of the second exemplary embodiment of an apparatus according to the first aspect of the present invention schematically illustrated in FIG. 4.

From this figure, it can be derived that the touch screen 200 comprises a transparent top cover 209 and a bottom cover 210. The analyzer 202, the comparator 203 and the processor 204 are embodied as single module. FIG. 5 also shows a read-out line $RL_i$ of the touch screen 200. It corresponds to the read-out line 101 depicted in FIGS. 1 and 2a.

The read-out line $RL_i$ comprises an electrical conductor 211 spanning longitudinal arms $LO_{i1}$ of a plurality of electrical circuit segments. The switches $SW_i$ of the lateral arms of the electrical circuit segments are also shown.

Exerting pressure on the transparent top cover 209 with a finger, and thus indirectly exerting pressure on a switch $SW_i$, can be seen as placing an object in the vicinity of a switch $SW_i$. Thereby, the respective switch $SW_i$ is caused to close. The switches $SW_i$ can for example be switches comprising an electrically conductive element that is configured to close a gap in another electrical conductor if a force is exerted on the electrically conductive element.

Figure 6:
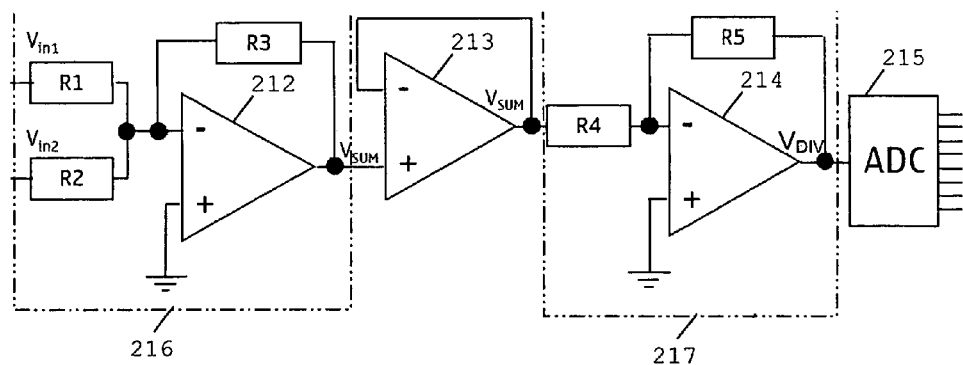
FIG. 6: a schematic illustration of the averaging circuit of the second exemplary embodiment of an apparatus according to the first aspect of the present invention schematically illustrated in FIG. 4.

FIG. 6 shows a schematic illustration of the averaging circuit 207 of the second exemplary embodiment of an apparatus according to the first aspect of the present invention schematically illustrated in FIG. 4.

The averaging circuit 207 comprises three operational amplifiers 212, 213 and 214. As shown in FIG. 6, the non-inverting input of the operational amplifier 212 is connected to ground. The input voltage $V_{in1}$ is applied to a first resistor R1, while the input voltage $V_{in2}$ is applied to a second resistor R2. In turn, the resistors R1 and R2 are electrically coupled to one another and they are electrically coupled to the inverting input of the operational amplifier 212. Via the resistor R3, the output $V_{SUM}$ of the operational amplifier 212 is fed back to its inverting input. Also, the output voltage $V_{SUM}$ of the operational amplifier 212 is applied to the non-inverting input of the operational amplifier 213, whose output is fed back to its non-inverting input and applied to the resistor R4. Resistor R4 is electrically coupled to the inverting input of the operational amplifier 214, the non-inverting input of which is connected to ground. Via the resistor R5, the output voltage $V_{DIV}$ of the operational amplifier 214 is fed back to its inverting input and also provided to the analog-to-digital converter ADC.

With the resistors R1, R2 and R3 all having the same ohmic resistance, the components 212, R1, R2 and R3 thus serve as a summing amplifier 216, while the operational amplifier 213 is employed for impedance conversion. The components R4, R5 and 214 can be seen as an inverting amplifier 217. In the present case, the ohmic resistance of the resistor R4 is twice as high as the ohmic resistance of resistor R5.

The input voltages $V_{in1}$ and $V_{in2}$ comprise information on the coordinates of the closed switches $S_L$ and $S_R$ of the selected read-out lines $RL_L$ and $RL_R$, respectively. They can either be the voltages that are measured for the read-out lines $RL_L$ and $RL_R$ in the course of impedance measurement as explained above or they can be voltages that were chosen to represent the coordinates assigned to the closed switches $S_L$ and $S_R$ at a prior stage. In particular, they may have been obtained by digital-to-analog conversion of the coordinates of the closed switches $S_L$ and $S_R$ along a coordinate axis, for instance the y-axis. Since the resistors R1, R2 and R3 all have the same ohmic resistance, the output voltage $V_{SUM}$ of the operational amplifier 212 is the sum of the voltages $V_{in1}$ and $V_{in2}$ ($V_{SUM}=-(V_{in1}+V_{in2})$).

Having passed the impedance converter 213, the voltage $V_{SUM}$ is multiplied by $-0.5$ by the inverting amplifier 217 ($V_{DIV}=-0.5V_{SUM}=+0.5(V_{in1}+V_{in2})$). Thus, the mean of the input voltages $V_{in1}$ and $V_{in2}$ has been calculated. $V_{DIV}$ is then fed to analog-to-digital converter ADC, which provides an 8-bit digital number as an output. This number can represent the y-coordinate of the coordinate pair assigned to the combination of closed switches.

Figure 7:
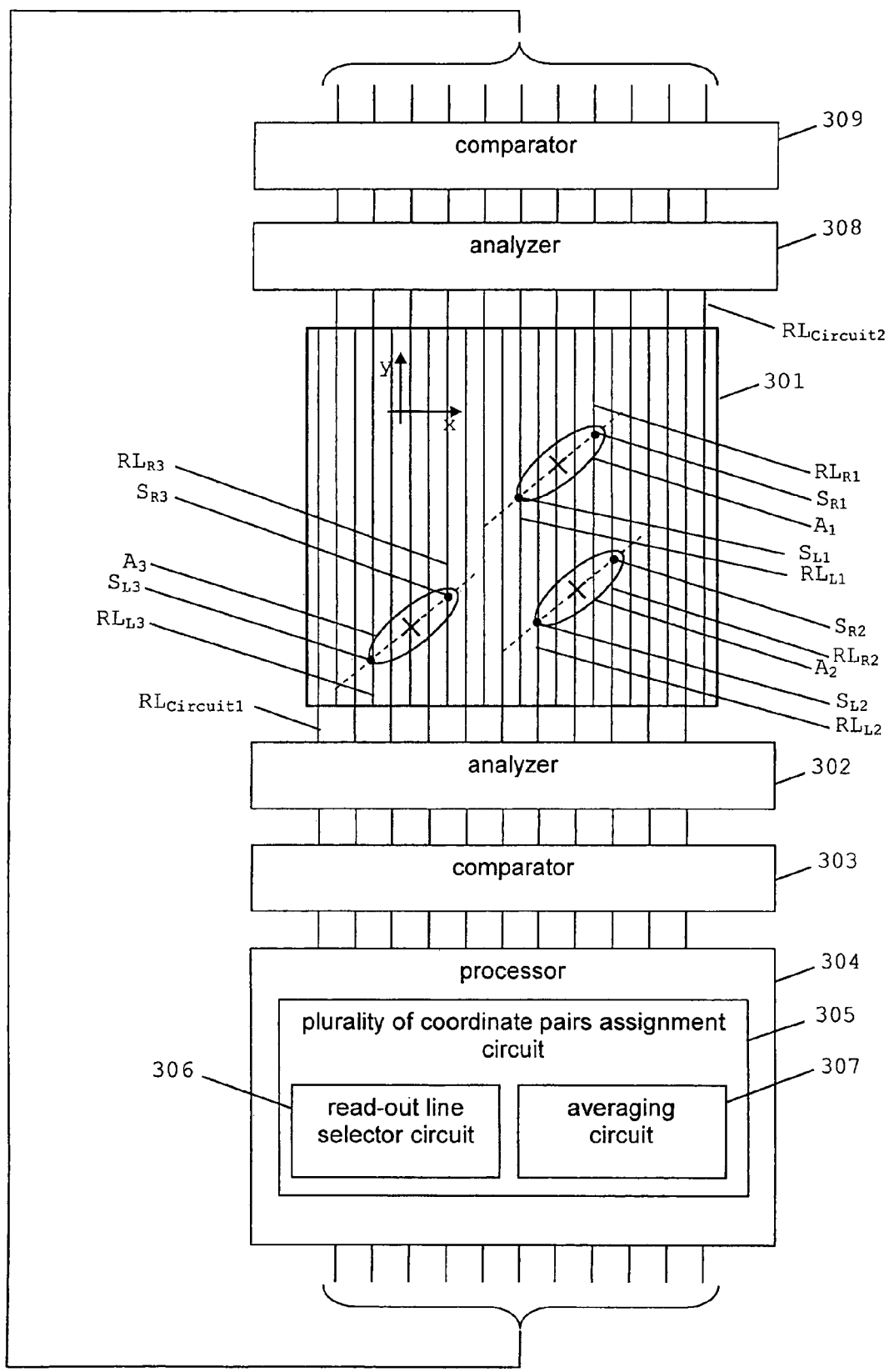
FIG. 7: a schematic illustration of a third exemplary embodiment of an apparatus according to the first aspect of the present invention.

FIG. 7 shows a schematic illustration of a third exemplary embodiment of an apparatus according to the first aspect of the present invention.

The apparatus is touch screen and thus comprises a touch screen panel 301. A plurality of read-out lines $RL_{Circuit1}$ and $RL_{Circuit2}$ forms part of the touch screen panel 301. While the read-out lines $RL_{Circuit1}$ are electrically coupled to the analyzer 302, the read-out lines $RL_{Circuit2}$ are electrically coupled to the analyzer 308. Analyzer 302 is operationally coupled to comparator 303 and analyzer 308 is operationally coupled to comparator 309. Further, a processor 304 is provided comprising the plurality of coordinate assignment circuit 305 which in turn comprises a read-out line selector circuit 306 and an averaging circuit 307.

The structure and mode of operation of the read-out lines $RL_{Circuit1}$ and $RL_{Circuit2}$, the analyzers 302 and 308, the comparators 303 and 309 and the averaging circuit 307 is not discussed as they have been explained in detail with respect to the embodiment depicted in FIG. 4.

It can be derived from FIG. 7 that the analyzer 302 is configured to measure the impedances of the read-out lines $RL_{Circuit1}$. The analyzer 308 is arranged on a side of the touch screen panel 301 opposed to the side of the touch screen panel 301 on which the analyzer 302 is provided. Measurement of the impedances of the read-out lines $RL_{Circuit1}$ and the read-out lines $RL_{Circuit2}$ is therefore performed from different ends. The read-out lines $RL_{Circuit1}$ and $RL_{Circuit2}$ are arranged in alternating order. One may consider the analyzers 302 and 308 as a single analyzer configured to measure the impedances of a plurality of pairs of read-out lines, each pair comprising one read-out line of the read-out lines $RL_{Circuit1}$ and one read-out line of the read-out lines $RL_{Circuit2}$, from opposed ends of the read-out lines of each pair. Dividing the read-out lines into two groups $RL_{Circuit1}$ and $RL_{Circuit2}$ based on the ends from which their impedances are measured, one may also say that two distinct read-out circuits are provided.

The processor 304 can also be thought of as means for assigning a plurality of coordinate pairs to a combination of closed switches. Alternatively, the plurality of coordinate pairs assignment circuit 305 can be seen as such means. In addition, analyzers 302 and 308 can be thought of as means for measuring the impedances of a pair of read-out lines $RL_{Circuit1}$ and $RL_{Circuit2}$ from opposed ends of the read-out lines $RL_{Circuit1}$ and $RL_{Circuit2}$.

Due to the current divider effect, if a plurality of switches of a read-out line of the group of read-out lines $RL_{Circuit1}$ is closed, comparing the measured impedance to a preset value corresponding to an allowable value of the impedance of the read-out line will only allow to infer that the closed switch of the plurality of closed switches that is arranged closest to a power supply used in measuring the impedance is closed. The same effect may occur with regard to a read-out line of the group of read-out lines $RL_{Circuit2}$. Since measuring the impedance of the second read-out line is performed from another end, the bias occurring regarding determination which of the switches along the read-out line is closed is different for the first group of read-out lines $RL_{Circuit1}$ and for the second group of read-out lines $RL_{Circuit2}$. As the processor 304 is configured to assign a plurality of coordinate pairs to a combination of closed switches, a coordinate pair can be assigned to the combination of closed switches of each closing area $A_1$, $A_2$ and $A_3$. How this goal can be achieved by means of the apparatus presently described will be elucidated in the following.

The read-out line selector circuit 306 of the plurality of coordinate pairs assignment circuit 305 of the processor 304 is configured to select two read-out lines of the plurality of read-out lines $RL_{Circuit1}$ and $RL_{Circuit2}$, each selected read-out line having a closed switch, wherein for each selected read-out line an adjacent read-out line does not have a closed switch or the distance of the closed switch of the adjacent read-out line along the y-axis to the closed switch of the selected read-out line exceeds a preset limit.

With respect to the first closing area $A_1$, it is noted that the read-out line selector circuit 306 selects read-out line $RL_{R1}$ although both its adjacent read-out lines have a closed switch. In particular, read-out line $RL_{R2}$ has the closed switch $S_{R2}$. Also, the left adjacent read-out line of read-out line $RL_{R2}$ has a closed switch. However, the distance between the closed switches $S_{R1}$ and $S_{R2}$ exceeds a preset limit. The limit can for example be a maximum allowable difference between the y-coordinates that are assigned to the closed switches $S_{R1}$ and $S_{R2}$. Therefore, read-out line $RL_{R1}$ is selected by the read-out line selector circuit 306. Since the left adjacent read-out line of read-out line $RL_{L1}$ does not have a closed switch and read-out line $RL_{L1}$ has the closed switch $S_{L1}$, read-out line $RL_{L1}$ is also selected. The read-out lines $RL_{L1}$ and $RL_{R1}$ constitute a pair of selected read-out lines. Averaging the coordinates of their closed switches $S_{R1}$ and $S_{L1}$ by means of averaging circuit 307 yields the coordinate pair represented by the cross in the center of the closing area $A_1$. Said coordinate pair is assigned to the combination of closed switches of closing area $A_1$ by the plurality of coordinate pairs assignment circuit 305.

It can only be derived by impedance measurement and comparison that switch $S_{R1}$ is closed because the analyzer 308 is configured to measure the impedance of the read-out line $RL_{R1}$ from and end opposed to the end of which the analyzer 302 measures the impedances of the read-out lines $RL_{Circuit1}$. Otherwise, the current divider effect would probably only allow concluding that a switch of the read-out line $RL_{R2}$, the switch forming part of the closing area $A_2$, is closed.

As the processor 304 or, more precisely, the plurality of coordinate pairs assignment circuit 305 is configured to assign a plurality of coordinate pairs to a combination of closed switches, a second coordinate pair can be assigned to the combinations of closed switches belonging to closing area $A_2$ and a third coordinate pair can be assigned to the combinations of closed switches belonging to closing area $A_3$. In computing a coordinate pair that is assigned to the combination of closed switches of closing area $A_2$, read-out line $RL_{R2}$ is selected because it right adjacent read-out line does not have a closed switch, while read-out line $RL_{L2}$ is selected due to the distance of the closed switch $S_{L1}$ of the left adjacent read-out line $RL_{L1}$ of read-out line $RL_{L2}$ to the closed switch $S_{L2}$ exceeding a predetermined maximum allowable limit. For the third closing area $A_3$, read-out lines $RL_{R3}$ and $RL_{L3}$ are selected since they both have an adjacent read-out line not having a closed switch.

Figure 8:
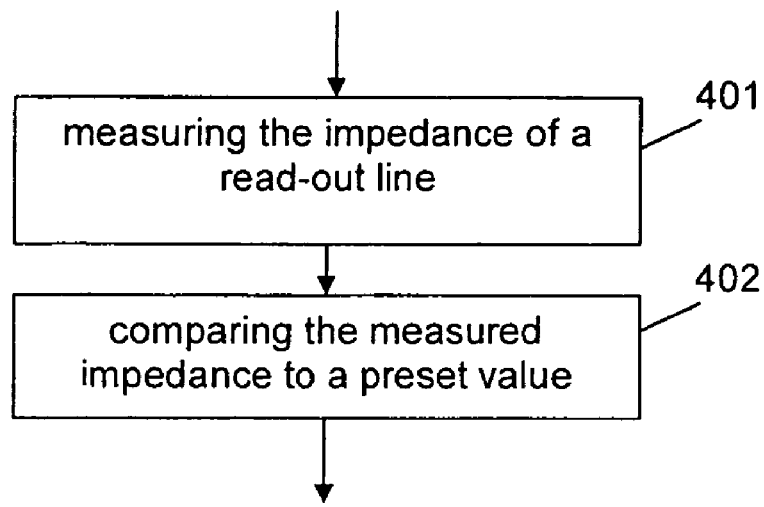
FIG. 8: a flowchart schematically illustrating a first exemplary embodiment of a method according to the second aspect of the present invention.

FIG. 8 shows a flowchart schematically illustrating a first exemplary embodiment of a method according to the second aspect of the present invention.

Step 401 of the method comprises measuring the impedance of a read-out line, the read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch. Step 402 of the method comprises comparing the measured impedance of the read-out line to a preset value corresponding to an allowable value of the impedance of the read-out line.

Figure 9:
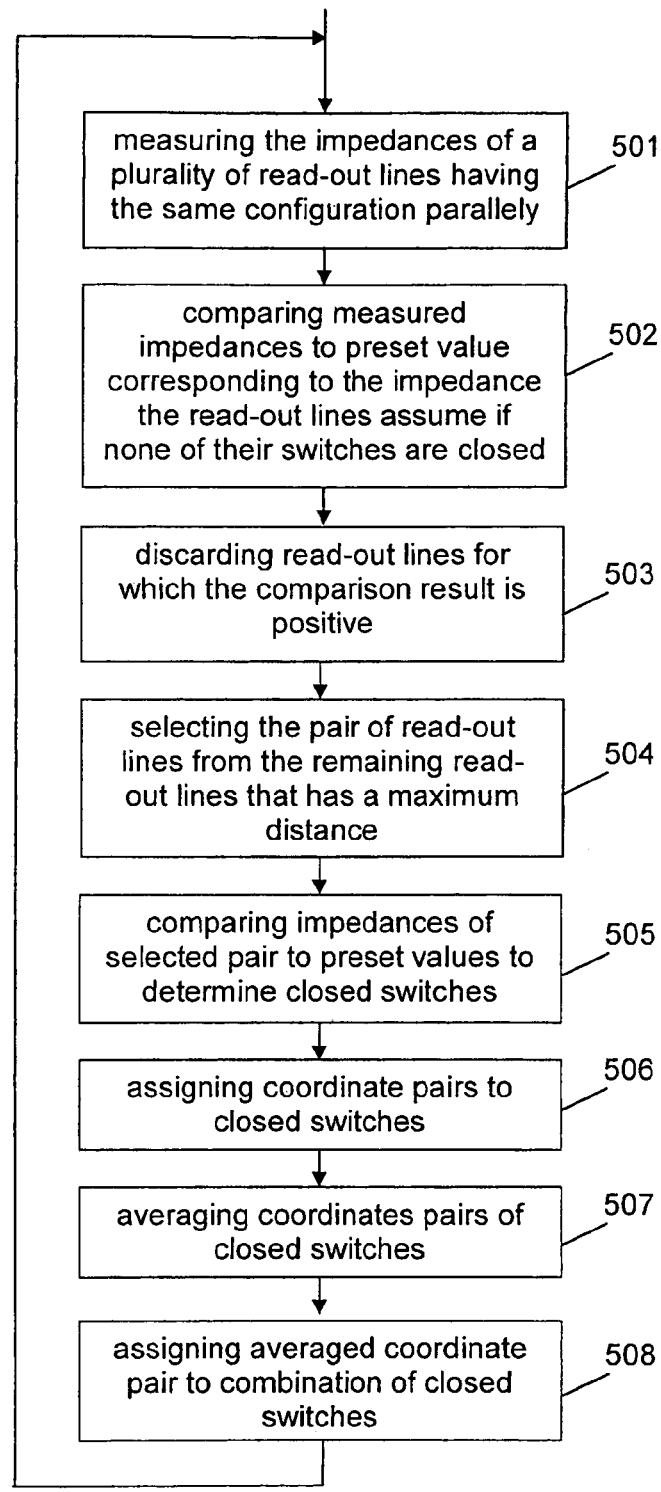
FIG. 9: a flowchart schematically illustrating a second exemplary embodiment of a method according to the second aspect of the present invention.

FIG. 9 shows a flowchart schematically illustrating a second exemplary embodiment of a method according to the second aspect of the present invention.

It is assumed that several switches along a plurality of read-out lines are closed in the following discussion of the flow chart.

In step 501 the impedances of a plurality of read-out lines are measured parallelly. Each read-out line has the same configuration and comprises at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch.

Since all read-out lines have the same configuration, their impedances assume the same value if none of their switches are closed. The measured impedances are compared to a preset value corresponding to the impedance the read-out lines assume if none of their switches are closed in step 502.

Step 503 comprises discarding the read-out lines for which the comparison result is positive, i.e. the read-out lines that do not have a closed switch.

Of the remaining read-out lines, the pair of read-out lines that has a maximum distance to each other is selected in step 504.

Next, in step 505, the impedances of the selected pair of read-out lines are compared to preset values to determine which of the switches of the pair of read-out lines are closed. The preset value corresponding to an allowable value of the impedances of the read-out lines for the first comparison is the impedance the read-out lines assume if the switch of the first electrical circuit segment of the read-out lines is closed. The preset value for the second comparison is the value the impedance of the read-out lines assumes if the switch of the second electrical circuit segment is closed, and so on. The comparison for the respective read-out line ceases if a comparison result is positive. Hence, the comparison is performed effectively because the current divider effect is kept in mind. It can then be determined which of the switches of the pair of selected read-out lines are closed.

Step 506 comprises assigning a coordinate pair to each of the closed switches of the selected pair of read-out lines. The coordinate values of said two coordinate pairs are averaged in step 507 and the averaged coordinate pair is assigned to the combination of closed switches in step 508. It is then returned to step 501 and the process is repeated. Thus, if the combination of closed switches has changed, a new coordinate pair will be assigned to it.

Figure 10:
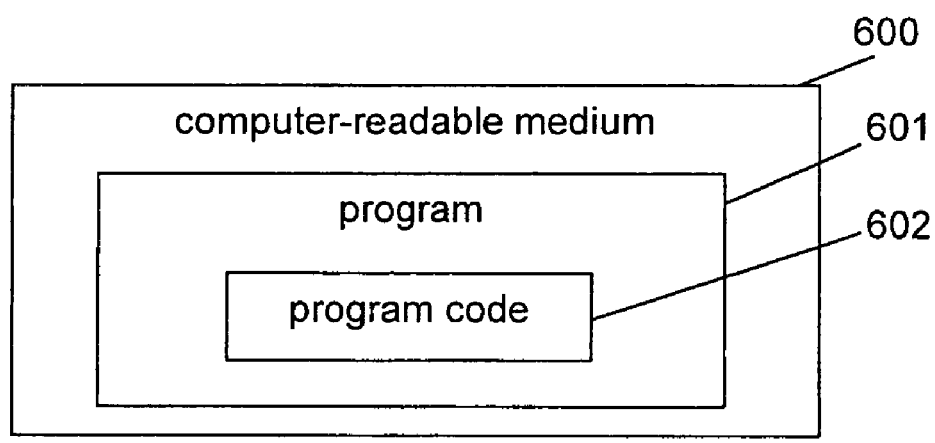
FIG. 10: a schematic illustration of an embodiment of a computer-readable medium according to the third aspect of the present invention.

FIG. 10 shows a schematic illustration of an embodiment of a computer-readable medium 600 according to the third aspect of the present invention.

A program 601 according to the fifth aspect of the present invention is stored thereon. The program 601 comprises program code 602. When executed by a processor, the instructions of the program code 602 cause the processor to control an analyzer to measure the impedance of a read-out line, the read-out line comprising at least two cascaded electrical circuit segments each electrical circuit segment comprising two longitudinal arms, wherein one of the longitudinal arms comprises an electrical component, and a lateral arm comprising a switch configured to close in the presence of an object in the vicinity of the switch. The instructions of the program code 602 further cause the processor to compare the measured impedance of the read-out line to a preset value corresponding to an allowable value of the impedance of the read-out line.

It is to be understood that with respect to all of the above embodiments that relate to a processor, the processor may for instance be implemented in hardware alone, may have certain aspects in software alone, or may be a combination of hardware and software. The processor may either be a separate module or it may be a subcomponent of a module such as, for example, a processor or an application specific integrated circuit (ASIC) that has other functional components or structures, too.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electromagnetic or optic type and may be read and executed by a processor, such as for instance a microprocessor. To this end, the processor and the storage medium may be coupled to interchange information, or the storage medium may be included in the processor.

The invention has been described above by means of exemplary embodiments. It should be noted that there are alternative ways and variations which are obvious to a skilled person in the art and can be implemented without deviating from the scope and spirit of the appended claims.

What is claimed is:

1. A touch controller, comprising:
a read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch,
an analyzer configured to measure the impedance of the read-out line,
a comparator configured to compare the measured impedance of the read-out line to a preset value corresponding to an allowable value of the impedance of the read-out line.

2. The touch controller of claim 1, wherein the electrical component comprises an electrical conductor spanning longitudinal arms of a plurality of electrical circuit segments.

3. The touch controller of claim 1, wherein measuring the impedance of the read-out line comprises measuring only one of the inductance, the capacitance and the ohmic resistance of the read-out line.

4. The touch controller of claim 1, wherein it comprises a plurality of read-out lines.

5. The touch controller of claim 4, wherein the analyzer is one of:
configured to measure the impedances of the plurality of read-out lines sequentially,
configured to measure the impedance of the plurality of read-out lines parallelly.

6. The touch controller of claim 4, wherein the comparator is one of:
configured to compare the measured impedances of the read-out lines to preset values, each preset value corresponding to an allowable value of the impedance of the respective read-out line, sequentially,
configured to compare the measured impedances of the read-out lines to preset values, each preset value corresponding to an allowable value of the impedance of the respective read-out line, parallelly.

7. The touch controller of claim 4, wherein the read-out lines of the plurality of read-out lines have a similar configuration.

8. The touch controller of claim 4, wherein the read-out lines are arranged in parallel.

9. A user interface comprising the touch controller of claim 1.

10. The touch controller of claim 1, wherein the object is a user's finger.

11. The touch controller of claim 1, wherein the touch controller further comprises a processor configured to assign a coordinate pair to at least one closed switch.

12. The touch controller of claim 11, wherein assigning a coordinate pair to a combination of closed switches involves selecting a read-out line of a plurality of read-out lines.

13. The touch controller of claim 12, wherein assigning a coordinate pair to a combination of closed switches involves selecting the pair of read-out lines of all read-out lines comprising a closed switch that has a maximum distance to each other.

14. The touch controller of claim 12, wherein assigning a coordinate pair to a combination of closed switches involves selecting two read-out lines of a plurality of read-out lines, each selected read-out line having a closed switch, wherein for each selected read-out line an adjacent read-out line does not have a closed switch or the distance of the closed switch of the adjacent read-out line along an axis extending in the direction of the read-out lines to the closed switch of the selected read-out line exceeds a preset limit.

15. The touch controller of claim 11, wherein assigning a coordinate pair to a combination of closed switches involves averaging coordinates of a plurality of switches.

16. The touch controller of claim 1, wherein the touch controller further comprises a processor configured to assign a plurality of coordinate pairs to a combination of closed switches and in that the analyzer is configured to measure the impedances of a pair of read-out lines from opposed ends of the read-out lines.

17. A touch controller, comprising:
- a read-out line comprising at least two cascaded electrical circuit segments, each electrical circuit segment comprising two longitudinal arms, wherein one of the longitudinal arms comprises an electrical component, and a lateral arm comprising means for closing in the presence of means for inputting in their vicinity,
- means for measuring the impedance of the read-out line,
- means for comparing the measured impedance of the read-out line to a preset value corresponding to an allowable value of the impedance of the read-out line.

18. A method for use by a touch controller, comprising:
- measuring the impedance of a read-out line, the read-out line comprising at least two cascaded electrical circuit segments, each electrical circuit segment comprising two longitudinal arms, wherein one of the longitudinal arms comprises an electrical component, and a lateral arm comprising a switch configured to close in the presence of an object in the vicinity of the switch, and
- comparing the measured impedance of the read-out line to a preset value corresponding to an allowable value of the impedance of the read-out line.

19. A non-transitory computer-readable medium having a computer program stored thereon, the computer program comprising instructions operable to cause a processor of a touch controller to:
- control an analyzer to measure the impedance of a read-out line, the read-out line comprising at least two cascaded electrical circuit segments each electrical circuit segment comprising two longitudinal arms, wherein one of the longitudinal arms comprises an electrical component, and a lateral arm comprising a switch configured to close in the presence of an object in the vicinity of the switch,
- to compare the measured impedance of the read-out line to a preset value corresponding to an allowable value of the impedance of the read-out line.

* * * * *